United States Patent
Becker

Patent Number: 6,034,697
Date of Patent: Mar. 7, 2000

[54] INTERPOLATION BETWEEN RELATIONAL TABLES FOR PURPOSES OF ANIMATING A DATA VISUALIZATION

[75] Inventor: Barry Glenn Becker, Mountain View, Calif.

[73] Assignee: Silicon Graphics, Inc., Mountain View, Calif.

[21] Appl. No.: 08/987,242

[22] Filed: Dec. 9, 1997

Related U.S. Application Data

[63] Continuation-in-part of application No. 08/782,809, Jan. 13, 1997, Pat. No. 5,861,891.

[51] Int. Cl.[7] .................................................. G06F 15/00

[52] U.S. Cl. ............................................................ 345/433

[58] Field of Search .................................. 345/433, 440, 345/430, 431, 133, 150

[56] References Cited

U.S. PATENT DOCUMENTS

| | | | |
|---|---|---|---|
| 3,816,726 | 6/1974 | Sutherland et al. | 345/524 |
| 4,868,771 | 9/1989 | Quick et al. | 364/578 |
| 4,928,247 | 5/1990 | Doyle et al. | 395/160 |
| 4,994,989 | 2/1991 | Usami et al. | 395/120 |
| 5,043,920 | 8/1991 | Malm et al. | 395/119 |
| 5,072,395 | 12/1991 | Bliss et al. | 364/443 |
| 5,150,457 | 9/1992 | Behm et al. | 395/120 |
| 5,164,904 | 11/1992 | Sumner | 364/436 |
| 5,282,262 | 1/1994 | Kurashige | 395/126 |
| 5,295,243 | 3/1994 | Robertson et al. | 395/160 |
| 5,307,456 | 4/1994 | MacKay | 395/154 |
| 5,459,829 | 10/1995 | Doi et al. | 395/152 |
| 5,528,735 | 6/1996 | Strasnick et al. | 395/127 |
| 5,555,354 | 9/1996 | Strasnick et al. | 395/127 |
| 5,732,230 | 3/1998 | Cullen et al. | 395/339 |
| 5,861,891 | 1/1999 | Becker | 345/433 |

OTHER PUBLICATIONS

Aha, D.W. et al., "Instance–Based Learning Algorithms," *Machine Learning*, vol. 6, No. 1, pp. 37–66 (Jan. 1991).

Almuallim, H. and Dietterich, T.G., "Learning Boolean Concepts in the Presence of Many Irrevelant Features," *Artificial Intelligence*, vol. 69, Nos. 1–2, pp. 279–305 (Sep. 1994).

"ANGOSS Software Announces Knowledge Studio Data Mining Solution," http://www.pathfinder.com@@xIEkOgYAVjbJZjKM/money/latest/press/PW/1997Oct17/92, Angoss Software Corporation, pp. 1–2, Oct. 1997.

(List continued on next page.)

*Primary Examiner*—Phu K. Nguyen
*Attorney, Agent, or Firm*—Sterne, Kessler, Goldstein & Fox P.L.L.C.

[57] ABSTRACT

A method, system, and computer program product are provided for a new data visualization tool that visually approximates a scatter plot and provides smooth animation of graphics by using interpolated data. An interpolation process is performed over pre-processed bins of scattered data points. A user can smoothly animate a plot along several dimensions by using an external query device to vary a selected data attribute. If the external query device (or slider) control is positioned in between discrete positions of the slider, the displayed plot corresponds to interpolated data. Adjacent data structures are determined corresponding to the position of the external query device. The adjacent data structures are merged together, then aggregated the using the spatial columns of the data structure as a unique key. An interpolated bin is generated, where the weight of the bin is interpolated and the dependent attribute is also interpolated and weighted. The interpolated dependent attribute is mapped to color in the visualized scatter plot. The plot appears as rendered splats corresponding to bin positions of the interpolated bins, where each splat has an opacity that is a function of the interpolated weight of data points in the corresponding bin.

23 Claims, 12 Drawing Sheets

OTHER PUBLICATIONS

"Angoss Software's KnowledgeSeeker(TM) Compatible with SAS Institute," http://www.newswire.ca/releases/September1997/18/c3915.html, pp. 1–2, Canada Newswire, Sep. 1997.

Breiman et al., *Classification and Regression Trees*, Wadsworth International Group, entire book (1984).

Cestnik, B., "Estimating Probabilities: A Crucial Task in Machine Learning," Proceedings of the 9th European Conference on Artificial Intelligence, pp. 147–149 (Aug. 1990).

"Companies in Data Mining and Knowledge Discovery," http://kdnuggets.com/companies.html, pp. 1–4, Last updated: Oct. 31, 1997.

Cormen, T.H., et al., *Introduction to Algorithms*, The MIT Press, pp. 263–280 (1990).

Cover and Thomas, *Elements of Information Theory*, Wiley Interscience, entire book, 1991.

Dasarathy, B.V., "Nearest Neighbor (NN) Norms: (NN) Patterns Classification Techniques," (IBL), *IEEE Computer Society Press*, pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifer," *Machine Learning:* Proceedings of the 13th International Conference (ICML '96), pp. 105–112 (1996.

Duda, R. and Hart, P., *Pattern Classification and Scene Analysis*, Wiley, entire book, (1973).

Fairchild, K.M., "Information Management Using Virtual Reality–Based Visualizations," *Virtual Reality Applications and Explorations*, ed. A. Wexelblat, Academic Press, Inc., pp. 45–74, Copyright (1993), Publication date Jul. 1, 1993.

Fisher, R.A., "The use of multiple measurements in taxonomic problems," *Annals of Eugenics*, vol. 7., No. 1, pp. 179–188 (1936).

Friedman, J. H. et al., "Lazy Decision Trees," Proceedings of the Thirteenth National Conference on Artificial Intelligence, AAAI Press and the MIT Press, vol. 1, pp. 717–724. (1996).

Good, I.J., *The Estimation of Probabilities: An Essay on Modern Bayesian Methods*, pp. xi–xii, MIT Press, pp. 1–79, (1965).

"IBM Digs Deep for Data Mining 'Gold'," http://www.software.ibm.com/data/intelli–mine/factsheet.html, pp. 1–8, IBM Corporation, Copyright 1997.

"KD Mine: Data Mining and Knowledge Discovery," http://kdnuggets.com/index_kdm.html, p. 1, Knowledge Discovery Nuggets, Copyright 1997, Last updated: Oct. 31, 1997.

Kittler, J., "Feature Selection and Extraction," *Handbook of Pattern Recognition and Image Processing*, Chapter 3, pp. 59–83, Academic Press, Inc., 1986.

Knuth, A., *The Art of Computer Programming*, Addison–Wesley, vol. 2, pp. 506–550 (1973).

Kohavi, R., "Scaling Up the Accuracy of Naive–Bayes Classifiers: a Decision–Tree Hybrid," In *Data Mining and Visulaization*, Silicon Graphics, Inc., from The Second International Conference on Knowledge Discovery and Data Mining (1996).

Kohavi, R., "A Study of Cross–Validation and Bootstrap for Accuracy Estimation and Model Selection," Proceedings of the 14th International Joint Conference on Artificial Intelligence, Stanford University, 1995.

Kohavi, R. and John, G., "Wrappers for Feature Subset Selection," http://robotics.stanford.edu/~{ronnyk.gjohn}, May 20, 1997.

Kohavi, R. and Li, C., "Oblivious Decision Trees, Graphs, and Top–Down Pruning," Proceedings of the 14th International Joint Conference on Artificial Intelligence, Chriss S. Mellish (Ed.), Morgan Kaufmann Publishers, Inc., pp. 1071–1077 (1995).

Kohavi, R. and Sommerfield, D., "Feature Subset Selection Using the Wrapper Model: Overfitting and Dynamic Search Space Topology," Proceedings of the First International Conference on Knowledge Discovery and Data Mining, pp. 191–197 (Aug. 1995).

Kohavi, R. et al., "Data Mining using MLC++: A Machine Learning Library in C++," *Tools With AI*, pp. 234–245 (1996).

Kononenko, I., "Inductive and Bayesian Learning in Medical Diagnosis," *Applied Artificial Intelligence*, vol. 7, pp. 317–337 (1993).

Langley, P. and Sage, S., "Induction of Selective Bayesian Classifiers," Proceedings of the Tenth Conference on Uncertainty in Artificial Intelligence, Morgan Kaufmann Publishers, Inc., pp. 399–406 (Jul. 1994).

Langley, P. and Sage, S., "Oblivious Decision Trees and Abstract Cases," Working Notes of the AAAI–94 Workshop on Case–Based Reasoning, AAAI Press, pp. 113–117 (1994).

Langley, P., et al., "An Analysis of Bayesian Classifiers," Proceedings of the Tenth National Conference on Artificial Intelligence, pp. 223–228 (Jul. 1992).

Lincoff, G., *National Audubon Society Field Guide to North American Mushrooms*, New York, pp. 9–32, (1981).

Mangasarian, O. L. and Wolberg, W. H., "Cancer Diagnosis Via Linear Programming," *SIAM News*, vol. 23, No. 5, pp. 1–(Sep. 1990).

Michie, et al., *Machine Learning, Neural and Statistical Classification*, Ellis Norwood United, entire book, (1994).

Murthy, S. et al., "Randomized induction of oblique decision trees," Proceedings of the Eleventh National Conference on Artificial Intelligence, AAI Press/MIT Press, pp. 322–327 (1993).

"Other Web Sites for Data Mining and Knowledge Discovery," http://kdnuggets.com/websites.html, pp. 1–3, Last updated: Sep. 10, 1997.

Quinlan, J.R., C4.5: *Programs for Machine Learning*, Morgan Kaufmann Publishers, Inc., pp. 17–26 (1993).

Quinlan, J.R., "Induction of Decision Trees," *Machine Learning*, vol. 1, No. 1, pp. 81–106 (1986).

Rendell, L. and Seshu, R., "Learning hard concepts through constructive induction: framework and rationale," *Computational Intelligence*, vol. 6, No. 4, pp. 247–270 (Nov. 1990).

"SAS Data Mining Solution," http://www.sas.com/software/data_mining/whitepapers/solution.html, pp. 1–6, SAS Institute Inc., Copyright 1997, Last Updated Sep. 26, 1997.

Schaffer, C., "Conservation Law for Generalization Performance," *Machine Learning:* Proceedings of the Eleventh International Conference, Morgan Kaufmann Publishers, Inc., pp. 259–265 (1994).

Shavlik, J.W. and Dietterich, T.G. (Eds.), *Readings in Machine Learning*, Morgan Kaufmann Publishers, Inc., entire book, (1990).

"S*i*ftware: Tools for Data Mining and Knowledge Discovery," http://kdnuggets.com/siftware.html, pp. 1–2, Last updated: Oct. 31, 1997.

Thrun et al., "The Monk's Problems: A Performance Comparison of Different Learning Algorithms," *Technical Report CMU–CS–91–197*, Carnegie Mellon University pp. i–x and 1–112, (1991).

Utgoff, P., "Perception Trees: A Case Study in Hybrid Concept Representation," Proceedings of the Seventh National Conference on Artificial Intelligence, Morgan Kaufmann, vol. 2, pp. 601–606 (Aug. 1988).

Weiss, S.M. and Kulikowski, C.A., *Computer Systems That Learn: Classification and Prediction Methods from Statistics, Neural Nets, Machine Learning, and Expert Systems*, Morgan Kaufmann Publishers, Inc. entire book, (1991).

MineSet User's Guide, Silicon Graphics Computer Systems, 1996, made available to public less than one year prior to Jan. 13, 1997.

Greenwood, J., "Countdown to the Cybermarket," Financial Post Magazine, Mar. 1994, pp. 26–32.

Boyl, J. et al., "Design of a 3D user interface to a database," submitted to Database Issues for Data Visualization Workshop, Jul., 1993, pp. 1–9.

Gershon, N. et al., "Visualization's New Tack: Making Sense of Information," IEEE Spectrum, Nov., 1995, pp. 38–47 and 55.

"Mineset Awards," http://www.sgi.com/Products/software/MineSet/awards.html, p. 1, (Jan. 9, 1998).

"Silicon Graphics MineSet Wins Bronze Miner Award," http://www.sgi.com/Headlines/1997/October/mineset_release.html, pp. 1–2, (Oct. 1, 1997).

"The 1997 Database Dozen," by D. Stodder, http://www.dbpd.com/96dozen.htm, pp. 1–2, (1996 or 1997).

"A Dozen Companies on the Rise," http://www.dbpd.com/seconddz.htm, pp. 1–9, (Miller Freeman Inc. 1997).

"MineSet 2.0 for Data Mining and Multidimensional Data Analysis," by C. Hall, http://www.sgi.com/Products/software/MineSet/DMStrategies/, pp. 1–12, (1997). (originally appeared in Sep. 1997 issue of *Data Management Stategies*, Copyright 1997 Cutter Information Corp.).

Ahlberg et al., "IVEE: An Information Visualization & Exploration Environment," Proceedings of Information Visualization '95, pp. 66–73.

Becker et al., "Smooth Transitions between Bump Rendering Algorithms," Computer Graphics Proceedings, Annual Conference Series, 1993, pp. 183–190.

Becker et al., "Unsteady Flow Volumes," Proceedings of Visualization '95, pp. 329–335.

Blinn, James F., "Light Reflection Functions for Simulation of Clouds and Dusty Surfaces," *Computer Graphics*, vol. 16, No. 3, Jul. 1982, p. 116–124.

Crawfis et al., "Texture Splats for 3D Scalar and Vector Field Visualization," Proceedings of IEEE Visualization '93, 1993, pp. 261–265.

Crawfis et al., "Vector Field Visualization," *Computer Graphics and Applications*, vol. 14, pp. 50–56, 1994.

Inselberg et al., "Parallel Coordinates: A Tool for Visualizating Multidimensional Geometry," Proceedings of Visualization '90, pp. 361–378.

Laur et al., "Heirarchical Splatting: A Progressive Refinement Algorithm for Volume Rendering," *Computer Graphics*, vol. 25, No. 4, Jul. 1991, pp. 285–288.

Levoy, Marc, "Volume Rendering: Display of Surfaces from Volume Data," *IEEE Computer Graphics and Applications*, vol. 8, No. 5, May 1988, pp. 29–37.

Martin et al., "High Dimensional Brushing for Interactive Exploration of Multivariate Data," Proceedings of Visualization '95, 1995, pp. 271–278.

Max et al., "Bump Shading for Volume Textures," *IEEE Computer Graphics and Applications*, Jul. 1994, 18–20.

Max et al., "Flow Volumes for Interactive Vector Field Visualization," Proceedings of Visualization '93, 1993, pp. 19–24.

Sabella, Paola, "A Rendering Algorithm for VIsualizing 3D Scalar Fields," *Computer Graphics*, vol. 22, No. 4, Aug. 1988, pp. 51–58.

Stein et al., "Sorting and Hardware Assisted Rendering for Volume Visualization," *IEEE*, 1995, pp. 83–89.

Van Wijk et al., "Hyperslice," Proceedings of Visualization '93, 1993, pp. 119–125.

Westover, Lee, "Footprint Evaluation for Volume Rendering," *Computer Graphics*, vol. 24, No. 4, Aug. 1990, pp. 367–376.

Wilhelms et al., "Coherent Projection Approach for Direct Volume Rendering," *Computer Graphics*, vol. 25, No. 4, Jul. 1991, pp. 275–284.

Wong et al., "Dual Multiresolution Hyperslice for Multivariate Data Visualization," IEEE Symposium on Information Visualization, Oct. 1996, pp. 74–75.

Pollack, A., "The 2–D Screen Gives 3–D World" New York Times 1990.

Foley et al., "Computer Graphics: Principals and Practice", Second Edition, Addison–Wesley Publishing Co., 1990, pp. 731–734 and color plate III.23.

Carlbom et al., "A Heirarchical Data Structure for Representing the Spatial Decomposition of 3–D Objects", *IEEE Computer Graphics & Applications*, Apr. 1985, pp. 24–31.

Carlbom et al., "Planar Geometric Projections and Viewing Transformations" *Computing Surveys*, vol. 10, No. 4, Dec. 1978, pp. 465–502.

Beveaux, T., "Virtual Reality Gets Real", *New Media*, (Jan. 1993), pp. 32–35.

Graves, G.L., "NASA's Virtual Reality", *New Media*, (Jan. 1993), p. 36–38.

Graves, G.L., "Invasion of the Digital Puppets", *New Media*, (Jan. 1993), p. 38–40.

Yavelow, C., "3–D Sound Found In Space", *New Media*, (Jan. 1993), pp. 40–41.

Johnson, Brian and Ben Shneiderman, "Tree–Maps: A Space Filling Approach to the Visualization of Hierarchical Information Structures", IEEE Visualization Proceedings '91, Oct. 1991, pp. 284–291.

Structural Dynamics Research Corporation News Release, "SDRC Announces Software Translator Between CADAM and I–DEAS", Mar. 31, 1992.

Jacobson, Bob, "The Ultimate User Interface", *BYTE*, Apr. 1992, pp. 175–182.

Clarkson, Mark., "An Easier Interface", *BYTE*, Feb. 1991, pp. 277–282.

Radding, Alan, "PC GIS: Expect Gain But Also Some Pain", *Computerworld*, Feb. 17, 1992, p. 89.

Hilderbrand, Carol, "GIS Vital In Utility's Duel with Competitor", *Computerworld*, Jan. 20, 1992, p. 43.

Anthes, G.H., "GIS Eases Redistricting Worry", *Computerworld*, Oct. 7, 1991, p. 65.

Alexander, Michael, "GIS Sprouting Corporate Wings", *Computerworld*, Jul. 22, 1991, p. 20.

Wilder, C., "Virtual Reality Seeks Practicality", *Computerworld 26* (*17*), Apr. 27, 1992, p. 26.

Fairchild, Kim M., Steven E. Poltrock and George W. Furnas, "SemNet: Three–Dimensional Graphic Representations of Large Knowledge Bases", *Cognitive Science and its Applications for Human–Computer Interaction,* Guindon, Ed., 1988, pp. 201–233.

*Precision Visuals International Limited,* "Summary of PV–WAVE Point & Click Visual Data Analysis Software", 1991.

Flanagan, William G., "Cyberspace Meets Wall Street", *Forbes,* Jun. 22, 1992, pp. 164–168.

Grinstein, G. et al., "Visualization for Knowledge Discovery", *Intl. J. Intelligent Systems 7,* 1992, pp. 637–648.

Fuller, J.E., Using Autocad, 3d Ed., Chapter 17, Viewing 3–D Drawings, 1989, pp. 17–1–17–14, and Tutorial, pp. 19–15–19–16, Delmar Publishers, Inc., Albany, NY 12212.

Alexander, M., "Visualizing Cleared–Off Desktops", *Computerworld 25 (18)*, May 6, 1991, p. 20.

Benedikt, M., ed., *Cyberspace First Steps,* The MIT Press, Cambridge, Massachusetts (1992), pp. 1–436.

Forrest, D., "Seeing Data in New Ways", *Computerworld,* Jun. 29, 1992, pp. 85–86.

Newquist, H.P., "Virtual Reality's Commercial Reality", *Computerworld 26 (3)*, pp. 93–95, 1992.

"Atlas Software: A New Dimension in Data Management", advertisement, Atlas Software, Strategic Mapping, Inc., San Jose, CA 95117 (1992).

"News: What's New—Business Software", *BYTE,* Mar. 1992, p. 78.

"A Map for All Reasons", advertisement, Strategic Mapping, Inc., San Jose, CA 95117 (1992).

News Release, Company: Information Builders, Dateline: Pacific Palisades, CA, "Remarkable 3D Main–Frame Graphics Available For PC Users", Feb. 1985.

News Release, Company: Information Builders, Inc., Dateline: Palm Desert, CA, "Information Builders Announces Release 3.0 of PC/Focus DBMS", Jun. 1, 1987.

News Release, Company: Honeywell Bull, Dateline: Bilerica, MA "Relational Software System Increases Integration, Productivity for Honeywell Bull Users", Jul. 17, 1987.

News Release, Company: Alliant Computer Systems, Dateline: San Diego, CA, "TGS' Figaro To Be Marketed With Silicon Graphics", Jul. 8, 1988.

News Release, Company: Alliant Computer Systems, Dateline: Atlanta, GA, "Alliant Debuts New Class of System The Visual Supercomputer", Aug. 2, 1988.

News Release, Company: Virtus, Dateline: Pleasanton, CA, "Individual Software Introduces Training for Microsoft Excel 3.0 Windows and Macintosh Versions", Jul. 31, 1991.

News Release, Company: Virtus Corporation, Dateline: Cary, NC, "Virtus Walkthrough Releases Quicktime Component", Nov. 1, ,1991.

News Release, Company: Alias Research, Dateline: Toronto, Ontario, "Alias Ships Sketch!, Freeform 3D Illustration and Design Program", Nov. 15, 1991.

News Release, Company: Structural Dynamics Res. Intl. Business Machines, Dateline: Boston MA, "Alias Sketch (TM) Resumes Shipping: Freeform 3D Illustration and Design Tool", Feb. 19, 1992.

GAUSSIAN TEXTURE — 700

6,034,697

INTERPOLATION BETWEEN RELATIONAL TABLES FOR PURPOSES OF ANIMATING A DATA VISUALIZATION

CROSS-REFERENCE TO RELATED APPLICATIONS

This is a continuation-in-part application of the commonly-owned application entitled "Method, System, and Computer Program Product for Visually Approximating Scattered Data", U.S. application Ser. No. 08/782,809, filed on Jan. 13, 1997 now U.S. Pat. No. 5,861,891 (incorporated by reference in its entirety herein).

This patent application is also related to the commonly-owned, co-pending application entitled "Computer-Related Method, System, and Program Product for Controlling Data Visualization in External Dimensions", U.S. application Ser. No. 08/748,548, by G. Sang'udi, et al., filed on Nov. 12, 1996 (incorporated by reference in its entirety herein).

BACKGROUND OF THE INVENTION

1. Field of the Invention

The present invention relates to visualizing scattered data points using a computer display.

2. Related Art

Computer visualization tools are called upon to handle ever increasing amounts of data. Conventional scatter plots visually represent multivariate data points as graphical glyphs plotted along one, two, or three axes. Each data point has one or more data attributes, also called variables. These data attributes can be numerical or categorical. Each axis can represent a different data attribute. Additional data attributes can be represented by varying the color or size of the glyphs.

Problems are encountered in visualizing scattered data when the number of data points is large. In general, each data point in a conventional scatter plot is represented by a corresponding glyph. As the number of scattered data points increases, more glyphs crowd a scatter plot display. The time it takes to render each glyph increases. The time it takes to build and display a scatter plot can become too long, thereby, precluding interactive, on-the-fly rendering of scattered data. Occlusion can also occur as data points in the foreground of a scatter plot hide data points behind them. A serious problem occurs when many data points occupy the same location.

To illustrate the above problem, consider a two-dimensional scatter plot containing millions of data points. It takes a very long time for a graphics processor to draw millions of glyphs covering all these data points. If each data point is represented by a single pixel on the screen, then there will be many overlapping data points. Only the data point for a glyph which is drawn last for a given pixel location will be seen.

The same problems occur in three-dimensional scatter plots where three-dimensional (3-D) glyphs (e.g., cubes, spheres, etc.) are used to represent data points. These 3-D glyphs are plotted with respect to three scatter plot axes. Rendering such a 3-D scatter plot for large numbers of data points can take a long time, as many glyphs must be processed. Moreover, if there are many data points to be covered, glyphs in the foreground occlude those in the back. Also, data is hidden when the data points are clustered together. There is no easy way to examine data inside a cluster.

What is needed is a data visualization tool that visually approximates a scatter plot when a large number of data points needs to be drawn. Further, what is needed is a visualization tool that provides for the smooth animation of a scatter plot along one or more additional dimensions.

SUMMARY OF THE INVENTION

The present invention provides a method, system, and computer program for a new data visualization tool that visually approximates a scatter plot and provides smooth animation of interpolated data. Through a binning process, bins of scattered data points are formed. Each axis of a scatter plot is discretized according to a binning resolution. Bin positions along each discretized scatter plot axis are determined from bin numbers.

According to the present invention, the bins, which represent a cloud of scattered data points, are volume rendered as splats. The opacity of each splat is a function of weight. The weight can be determined either as a function of the number of data points in a corresponding bin or by the value of some other attribute. The color of the splat is based on one or more data attributes associated with the data points in a corresponding bin. The data attribute(s) which is mapped to splat color can be an external data attribute(s) not represented by any scatter plot axis.

In one embodiment of the present invention, a scatter plot of data points is animated in a computer system using an external query data attribute. An external query device (such as a slider) corresponding to the attribute of the data points is used to animate over that data attribute. If the slider control is positioned in between discrete positions of the slider, the displayed plot corresponds to interpolated data. The discrete positions of the external query device correspond to binned values of that continuous dimension.

A method for displaying interploated data can be described as follows. First, adjacent data tables are determined corresponding to the position of the external query device. The adjacent data structures are merged together, then aggregated using the spatial columns of the data structure as a unique key. Interpolated rows (bins) are generated, where the weight of the bin is interpolated. The dependent attribute is also interpolated and weighted by the interpolated weight of the corresponding bin. The interpolated dependent attribute is mapped to color in the visualized scatter plot. The plot appears as rendered splats corresponding to bin positions of the interpolated bins, where each splat has an opacity that is a function of the interpolated count of data points in the corresponding bin. The present invention allows for the smooth animation of one or more external query attributes of the data points.

According to a further feature of the present invention, a dragger object is displayed that permits a user to select different regions inside a splat plot. Information about selected interpolated regions can then be displayed.

Further features and advantages of the present invention, as well as the structure and operation of various embodiments of the present invention, are described in detail below with reference to the accompanying drawings.

BRIEF DESCRIPTION OF THE DRAWINGS

The file of this patent application contains at least one drawing executed in color. Copies of this patent with color drawing(s) will be provided by the Patent and Trademark Office upon request and payment of the necessary fee.

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview and Terminology

Figure 1:
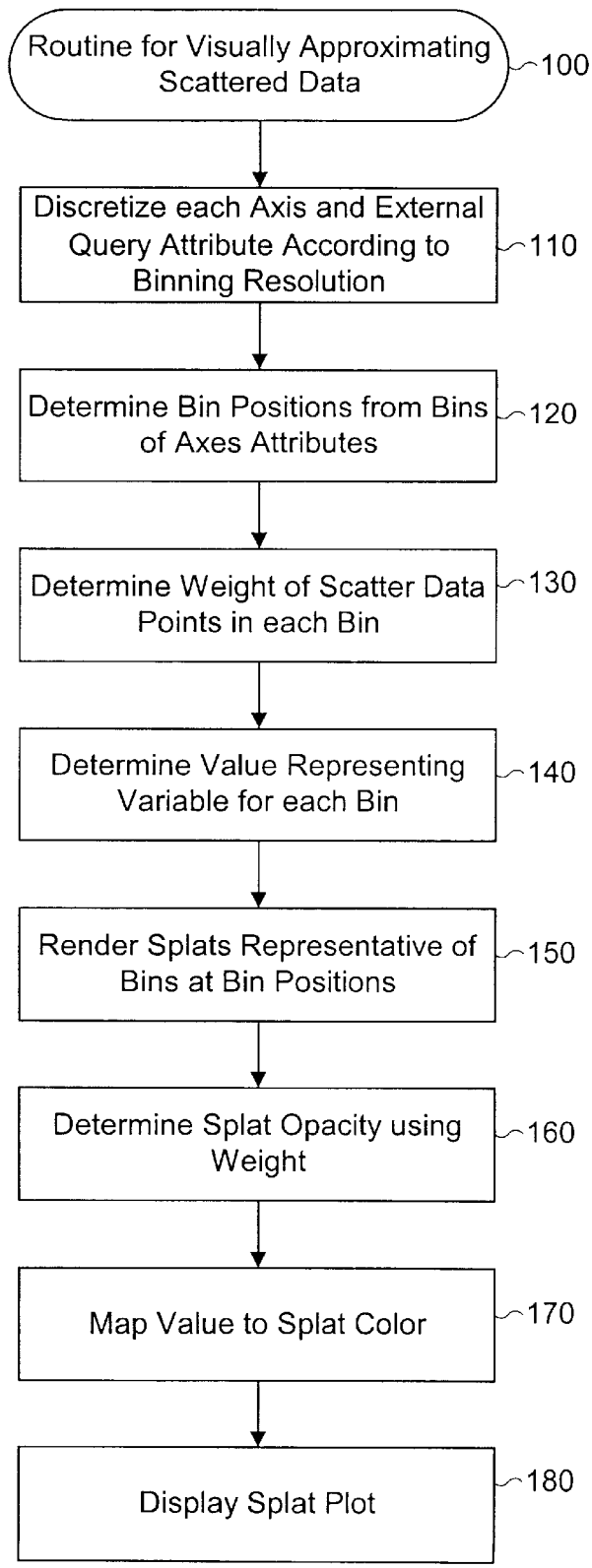
FIG. 1 is a flowchart showing a routine for visually approximating scattered data according to the present invention.

The present invention provides a new data visualization tool that visually approximates a scatter plot and provides smooth animation of graphics by using interpolated data. Bins, representing clouds of scattered data points, are volume rendered as splats. The opacity of each splat is a function of the density of data points (e.g. the count or number of data points) in a corresponding bin. The color of the splat represents a data attribute associated with the data points in a corresponding bin.

The following terms are used to describe the present invention:

"Data," "data points," "scattered data," "multivariate data," and equivalents thereof, are used interchangeably to refer to a data set having corresponding data attributes that are suitable for a multivariate data visualization, such as, a scatter plot. One data point can contain multiple data attributes. Data attributes are represented as numerical or categorical attributes in each axis of a scatter plot. Numerical attributes can include any type of numerical value or range (e.g. real numbers or integers). Categorical attributes have nominal values like text strings. For example, a data attribute representing color can include the following categorical attribute values: "red," "blue," and "orange." Numerical values can also be assigned to each categorical attribute value for sorting and other operations (i.e. "red" can be set to 1, "blue" can be set to 2, and "orange" can be set to 3).

Throughout this description, the terms "columns," "variables," and "attributes" are used interchangeably to refer to the characteristics of a given data point or set of data. In particular, within data mining terminology, data samples are characterized by one or more "attributes." In the present invention, data "attributes" are placed in separate "columns" of a data table. Eventually, these "attributes" or "variables" can either correspond to the spatial axes or to a color or opacity of a rendered scatter plot.

Additionally, the terms "row" and "record" are also used interchangeably. Each "row" or "record" in a processed data table corresponds to a particular "bin."In the present invention, these "bins" are eventually visualized as splats which approximate the scattered data points.

A 1-D scatter plot has one axis plotting one variable. A 2-D scatter plot has two axes plotting two variables. A 3-D scatter plot has three axes plotting three variables. Any type of data can be used, including but not limited to, business, engineering, science, and other applications. Data sets can be received as data records, flat files, relational or non-relational database files, direct user inputs, or any other data form.

"Binning" refers to any conventional process of dividing an attribute into ranges. Bins can be made up of uniform and/or non-uniform ranges.

"Splat" (also called a footprint) refers to any transparent shape used to build a transparent volume. For example, splats, when composited in a back to front order relative to an eye point (or a front to back order), can be used to reconstruct transparent volumes.

Splats used in the present invention can include, but are not limited to, Gaussian splats. A Gaussian splat is one that is most opaque at its center and approaches zero opacity, according to a Gaussian function in every radial direction. A Gaussian splat is typically approximated with a collection Gouraud shaded triangles, or more accurately, as a texture mapped polygon (e.g. rectangle).

Splats used in the present invention can also include, but are not limited to, the examples of splats described in the following articles (each of which is incorporated by reference herein): L. Westover, "Footprint Evaluation for Volume Rendering", Proceedings of SIGGRAPH '90, Vol 24 No 4, pp 367–376; Lauer and Hanrahan, "Hierarchial Splatting: A Progressive Refinement Algorithm for Volume Rendering," *Computer Graphics*, vol. 25, No. 4, July 1991, pp. 285–289; and Crawfis and Max, "Texture Splats for 3D Scalar and Vector Field Visualization", Proceedings of Visualization 1993, p 261–265. For instance, a splat can be drawn as a collection of Gouraud shaded triangles (see, e.g., the Lauer and Hanrahan 1991 article), or as texture mapped rectangles (see, e.g., the Crawfis and Max 1993 article).

Figure 7B:
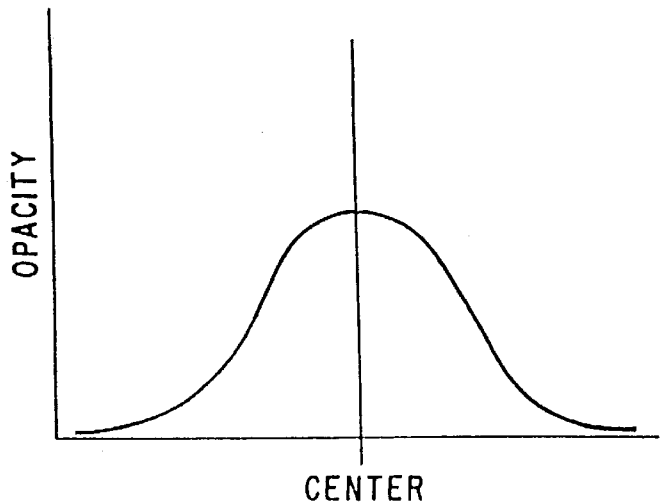
FIG. 7B is a graph of the opacity of the Gaussian texture in FIG. 7A.
Figure 7A:
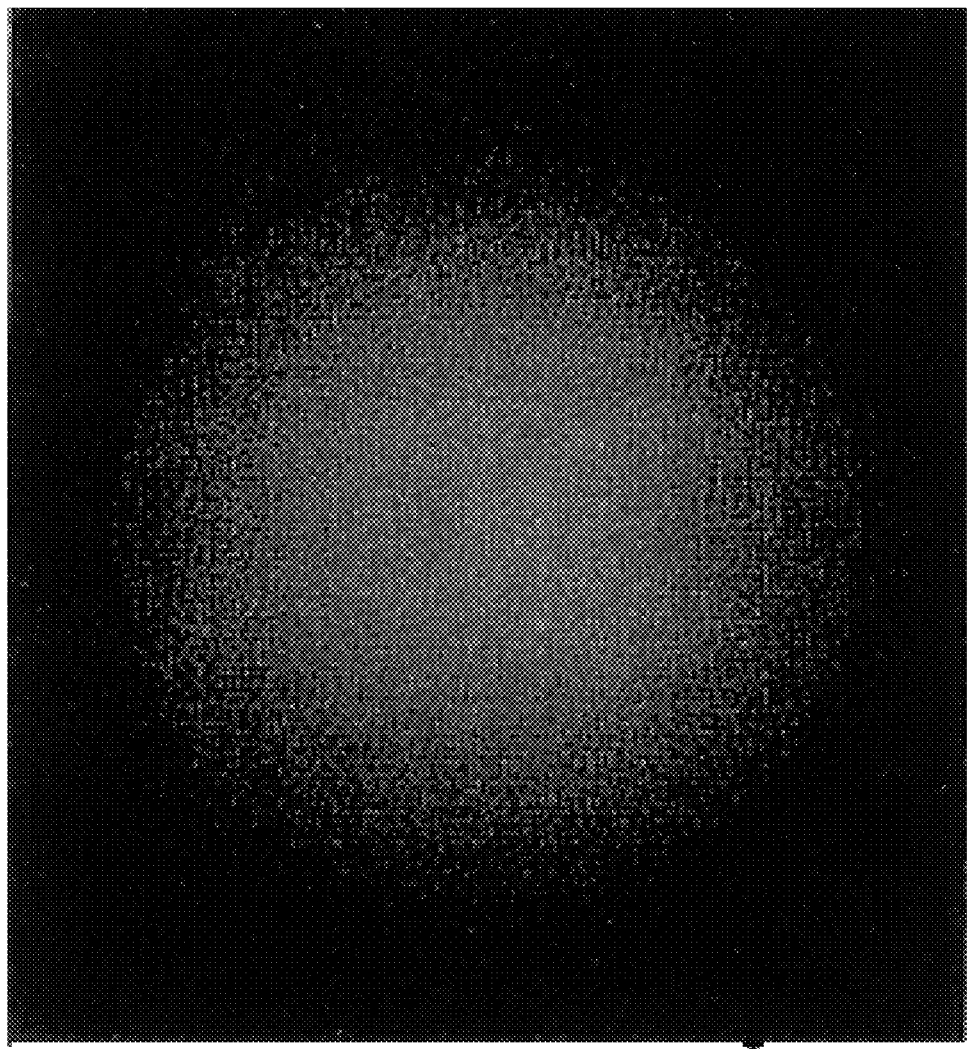
FIG. 7A is an image of an example Gaussian texture that can be texture mapped by a graphics engine to form a textured splat according to the present invention.

FIG. 7A shows an example of a Gaussian texture 700 that can be texture mapped by a graphics engine to form a textured splat. FIG. 7B is a graph of the opacity of Gaussian texture 700 illustrating the variation in opacity from a peak at the center to zero according to a Gaussian function.

An external query device or "slider" is used to vary the display of data in an external dimension. A slider is often a button or dial which a user moves along a scale to set the data visualization to a different value or range of values in the external dimension. A complete description of external query sliders is provided in the related '548 application, by G. Sang'udi, et al.

2. Example Environment

The present invention is described in terms of an example computer graphics and data mining environment. Given the description herein, it would be obvious to one skilled in the art to implement the present invention in any general computer including, but not limited to, a computer graphics processor (single chip or multiple chips), high-end to low-end graphics workstations, virtual machine (e.g. Java-created application), and network architectures (e.g., client/server, local, intermediate or wide area networks). In one preferred example, the present invention can be implemented as software, firmware, and/or hardware in a data mining tool, such as, the Mineset product released by Silicon Graphics, Inc., and executed on a graphics workstation manufactured by Silicon Graphics, Inc. (e.g., an Indigo$^2$, Indy, Onyx, or $O_2$ workstation). A further example computer system is described below with respect to FIG. 5, but is not intended to limit the present invention.

Description in these terms is provided for convenience only. It is not intended that the invention be limited to application in this example environment. In fact, after reading the following description, it will become apparent to a person skilled in the relevant art how to implement the invention in alternative environments.

3. Visually Approximating Scattered Data

FIG. 1 shows a routine 100 for visually approximating scattered data according to the present invention. For clarity, the steps of routine 100 will be described in general terms and with reference to a specific example. The specific example uses a sample ore data set of data records related to ore samples extracted from a mining site, as shown in the table below:

TABLE 1

Sample Ore Data Set

| Longitude (x) | Latitude (y) | Depth (z) | Value (color) |
|---|---|---|---|
| 6586.435 | 21866.457 | 9849.911 | 0.01 |
| 6585.729 | 21866.958 | 9850.411 | 0.01 |
| 6585.023 | 21867.459 | 9850.911 | 0.01 |
| 6584.317 | 21867.961 | 9851.411 | 0.02 |
| . | | | |
| . | | | |
| . | | | |
| 6568.526 | 22281.813 | 10028.994 | 2.35 |
| 6628.461 | 22281.813 | 10090.753 | 0.14 |
| 6650.017 | 22281.834 | 10094.368 | 0.02 |
| 6631.844 | 22281.848 | 10152.818 | 0.03 |
| 6599.928 | 22281.867 | 10067.001 | 0.05 |
| (8191 rows) | | | |

Each data record has four attributes (longitude, latitude, depth, and value) characterizing each ore sample. The first three attributes represent the x, y, z location (longitude, latitude, depth) of an ore sample within the mining site. The fourth attribute (value) gives an indication of the quality of the ore in the sample taken at that location. These four attributes are illustrative. Each data record can have many additional attributes.

A. Binning and Aggregating

In step 110, each scatter axis and external query attribute is discretized according to a binning resolution to form bins. In this example, there are no external query attributes shown in Table 1. In general, any conventional binning technique (uniform or non-uniform) can be used to bin numeric (i.e. real-valued) attributes and categorical attributes. If a categorical attribute is mapped to an axis then the binning is defined to be the distinct values of that attribute, or some grouping of these values based on metadata.

Preferably, uniform bins are created for each data attribute that is mapped to a scatter axis. Non-uniform bins can also be formed. In one simple example, each axis of a scatter plot can be discretized into k bins, where k is a positive integer. In a 2-D case, $k_1 * k_2$ bins (or "buckets") are available for aggregating data points on two respective discretized axes. In a 3-D case, $k_1 * k_2 * k_3$ bins are available for aggregating data points on three respective discretized axes. Binning is performed as part of pre-processing to reduce processing during rendering.

Bin positions are then determined from the bins (step 120). Bin positions define the order of bins along each discretized axis and can be determined from bin numbers associated with the bins. For a numeric attribute, the bin numbers are determined from the discretized real-values, that is, sorting the bins based on the discretized real-values and determining corresponding bin positions. For a categorical attribute, the bin numbers are determined from the distinct values of that attribute. The order of bins (and corresponding bin positions) along a discretized axis can be determined by sorting the distinct categorical values in any number of different ways. For example, sorting methods can include, but are not limited to, sorting based on alphabetical or numeric order, sorting based on count, or sorting based on an aggregate value (e.g. average) of the attribute mapped to color.

A sum of the weight of scattered data points aggregated into each bin is determined (step 130). An aggregate value that represents a data attribute of the scattered data points in a bin is determined for each bin as well (step 140). The aggregate value in one preferred example is an average value of a data attribute of scatter data points in a bin. The aggregate value can also be a minimum, maximum, median, count, or any other value representing a data attribute of scatter data points in a bin.

The aggregate value can represent an external attribute not mapped to an axis or a data attribute that is mapped to an axis. There could be multiple value columns in Tables 1 and/or 2, each value column representing a different data attribute. In the splat plot visualization as described below, it is a simple matter to select among the value columns for purposes of mapping the color without doing any additional computation.

A data structure can be created to store bin position, weight, and value data for each bin as determined in steps 120 to 140, respectively. For example, a new table having records corresponding to bins and data attributes representative of the bins (e.g. bin position, weight, and value of an external attribute) can be created. An example new binned table drawn from the sample ore data set of Table 1 for three-dimensions (longitude, latitude, and depth) is shown below:

TABLE 2

Binned Sample Ore Data Set

| Longitude-Bin | Latitude-Bin | Depth-Bin | Value | Weight |
|---|---|---|---|---|
| 0 | 15 | 17 | 0.02 | 6 |
| 0 | 21 | 12 | 0.02 | 3 |
| 1 | 20 | 0 | 0.02 | 1 |
| 1 | 21 | 12 | 0.0225 | 4 |
| 2 | 14 | 17 | 0.0266 | 3 |

TABLE 2-continued

Binned Sample Ore Data Set

| Longitude-Bin | Latitude-Bin | Depth-Bin | Value | Weight |
|---|---|---|---|---|
| 2 | 15 | 17 | 0.01 | 1 |
| 2 | 20 | 0 | 0.027 | 7 |
| . | . | . | . | . |
| . | . | . | . | . |
| . | . | . | . | . |
| 42 | 49 | 37 | 0.03 | 3 |
| 43 | 48 | 36 | 0.04 | 1 |
| 49 | 49 | 36 | 0.01 | 1 |
| (1743 rows) | | | | |

The binning resolution here is arbitrarily chosen to be k=50 making rendering about ten times faster than a scatter plot using all of the data points. A two-dimension example would only need two bin position data attributes (e.g., any two of longitude, latitude, or depth). One-dimension example would only need one bin position data attribute (e.g., longitude, latitude, or depth).

B. Rendering Splats

Next, in step 150, splats representative of the bins are rendered using a computer. A splat is drawn at each bin location to form an image that visually approximates an original scatter plot of the data. Splats are rendered in a back-to-front order (or front-to-back order) during compositing such that splats located furthest from a display screen are rendered before splats located closer to a display screen.

For each bin, the weight of scattered data points aggregated in the bin is mapped to a splat opacity (step 160). In one example, a graphics engine texture maps the opacity value across a polygon to represent a splat.

In one preferred embodiment, the splat opacity is a function of the weight of aggregated data points in a corresponding bin as determined by the following equation:

$$opacity = 1 - exp(-u*weight),$$

where, opacity represents the opacity value of a splat at its center, weight represents the weight of aggregated data points in a corresponding bin, u represents a global scale factor, and exp denotes an exponential function (such as, an exponential function having a natural logarithm base e). The above exponential opacity function is effective in modeling light propagation through clouds of light emitting spheres.

A slider or other GUI controller can be used to vary the value of the global scale factor u. This allows globally scaling of the opacity for each splat to make an entire display image of rendered splats more or less transparent. This scaling by the global scale factor, while impacting the entire image, is not linear. A splat's opacity is scaled differently depending upon its weight, e.g., the number of data points the splat represents.

Figure 6:
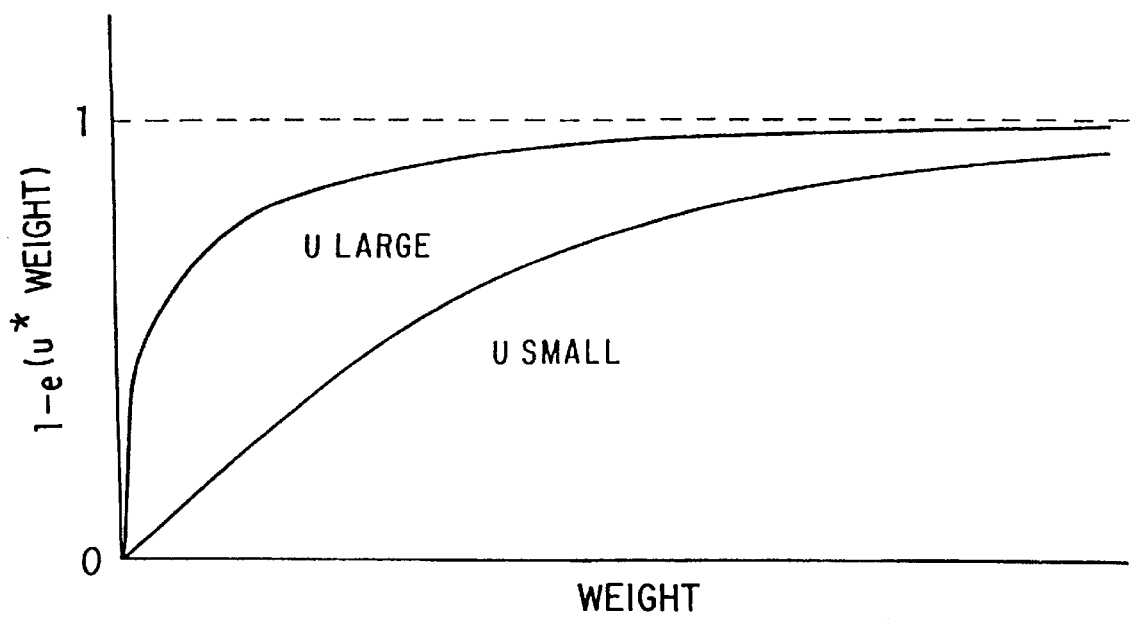
FIG. 6 is a graph showing an opacity function used in the present invention for large and small global scale factors.

FIG. 6 is a graph showing the above opacity function using large and small global scale factors. In particular, the opacity value for a splat is an exponential function of the weight of the scattered data points that approaches an asymptotic limit 1 for large weights. The global scale factor is set to a value (i.e. large or small) for a particular image. As shown in FIG. 6, when a large global scale factor is used, each splat's opacity approaches the asymptotic limit 1 more quickly (for lower weights) than a small global scale factor.

In step 170, the value representative of an attribute associated with the aggregated data points in a respective bin determined in step 140, is mapped to a color value. For example, a color transfer function can be used to map an average value of a numeric external attribute for each bin. Each splat is then rendered with a color value that is a function of the external attribute associated with the aggregated data points in a respective bin.

Finally, the splats are composited to form a volume rendered image on a display screen (step 180). The image includes the rendered splats with opacity and color determined according to steps 150–170. The splats are plotted along discretized scatter axes at bin positions determined in step 120. In this way, the volume rendered image is a splat plot that visually approximates the scattered data points.

Figure 2:
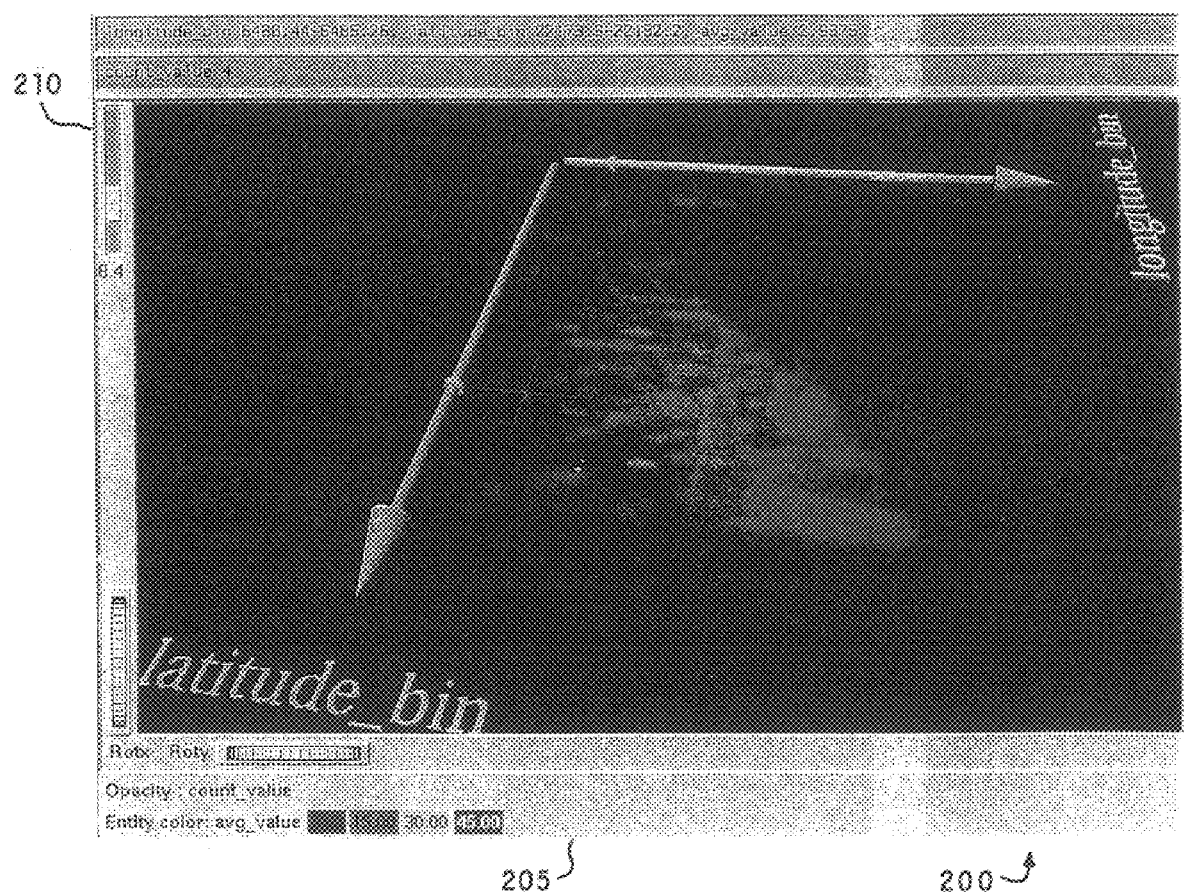
FIG. 2 is an example color image of a two-dimensional splat plot that uses splats to visually approximate scattered data according to the present invention.

FIG. 2 shows an example color image of a two-dimensional splat plot 200 that uses splats to visually approximate scattered data according to the present invention. Splat plot 200 was generated using the sample data described above with respect to Tables 1 and 2.

A display window 205 includes a slider 210 and two thumb wheels Rotx, Roty for manipulating the orientation of the two-dimensional splat scatter plot 200. Slider 210 globally alters the opacity of splats in the two-dimensional splat scatter plot 200. Thumbwheels Rotx and Roty rotate the image about horizontal and vertical axes respectively. Other controls (not shown) for manipulating the plot 200 such as, magnifying, reducing, or shifting the image can be used. Finally, a legend is provided to show what the opacity and color of the splats represent (e.g. opacity represents a weight value and color represents an average value, 0–15 is mapped to blue, 15–30 is mapped to green, 30–45 is mapped to yellow, and 45 and above is mapped to red).

Figure 3:
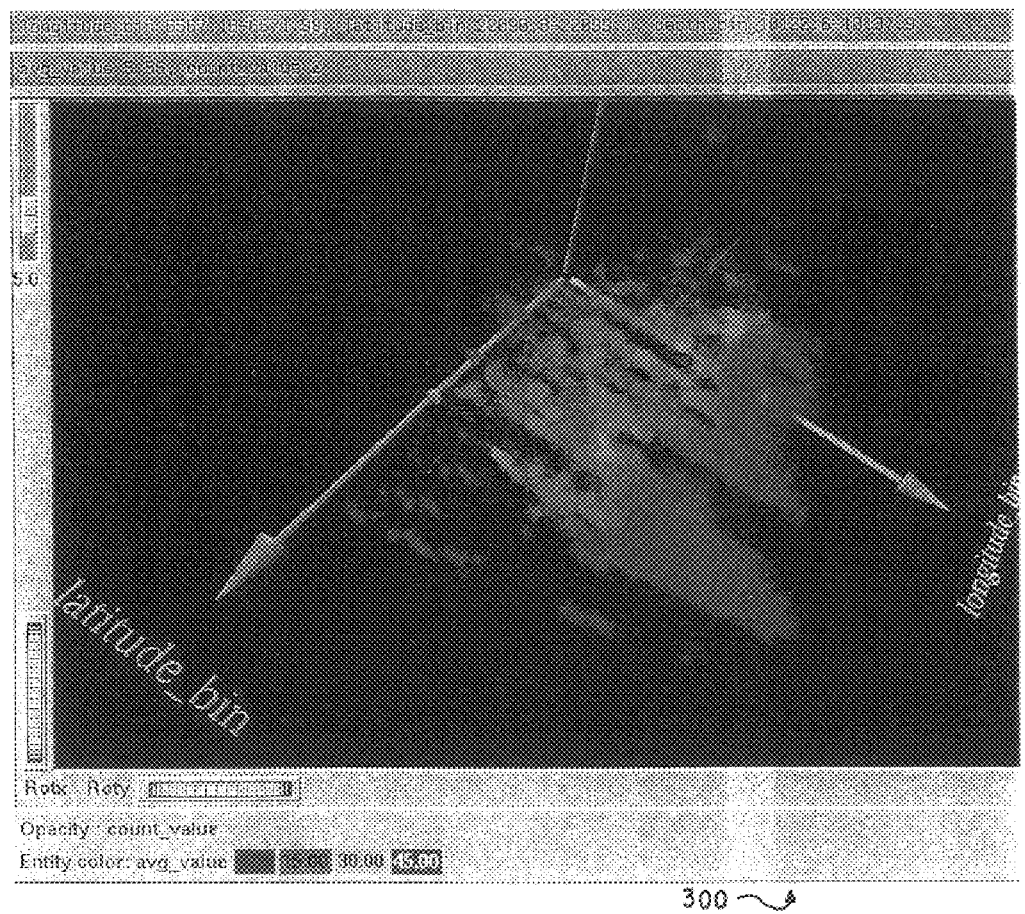
FIG. 3 is an example color image of a three-dimensional splat plot that uses splats to visually approximate scattered data according to the present invention.
Figure 4:
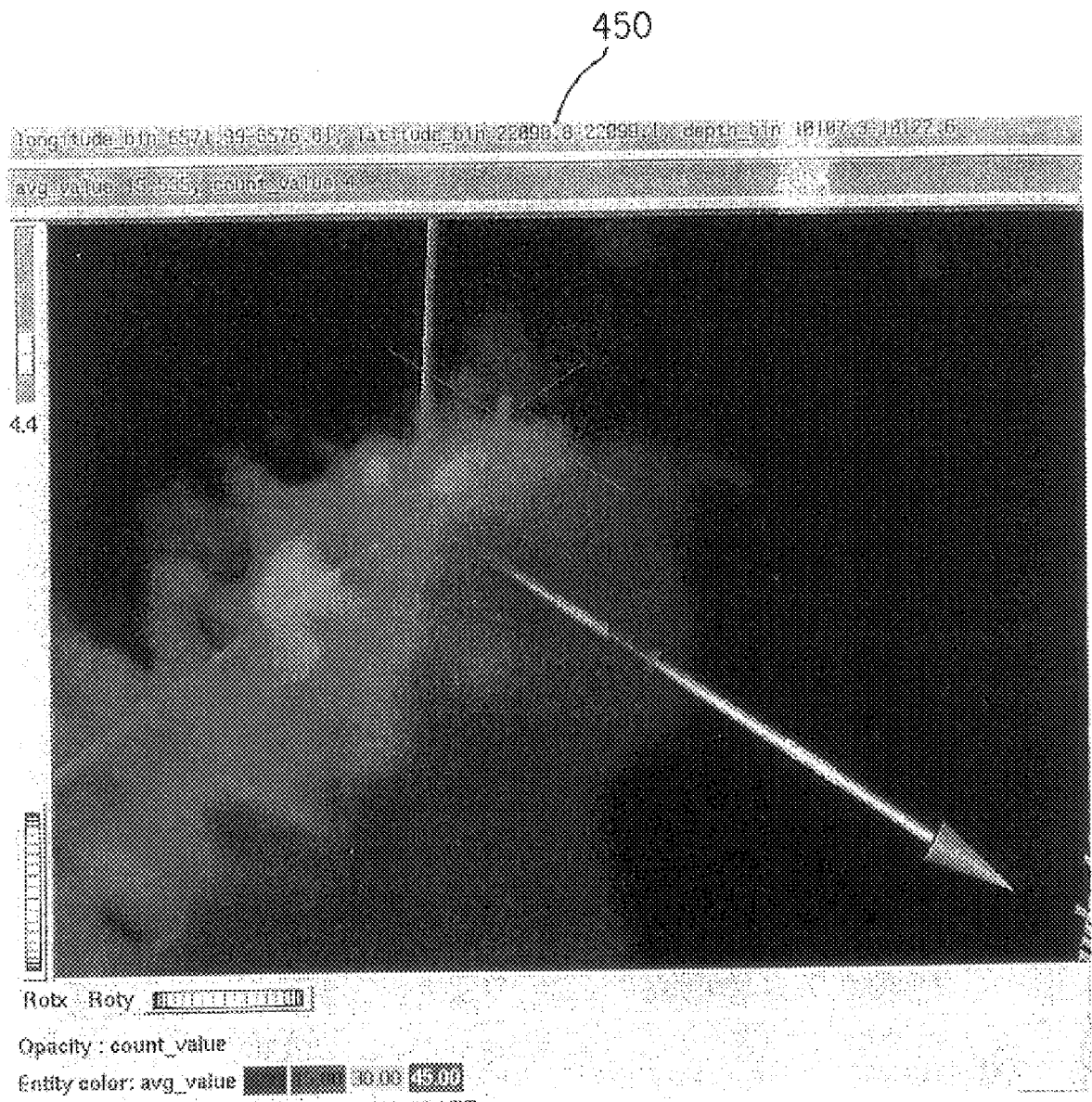
FIG. 4 is a close-up view of the color image of FIG. 3 further showing textured splats.

FIG. 3 shows an example color image of a three-dimensional splat plot 300 that uses splats to visually approximate scattered data according to the present invention. Splat plot 300 was generated using the sample data described above with respect to Tables 1 and 2. FIG. 4 shows a close-up view 400 of the color image of FIG. 3 which further shows an example of textured splats.

According to a further feature of the present invention, a dragger object is displayed to permit a user to select different regions inside the splat plot 400. The dragger object is shown in this example as a relatively opaque cylinder having reference axes that are parallel to the displayed scatter axes. The dragger object can be manipulated by a user through a mouse or other user-interface control.

Information about a selected region at which the dragger object is located can then be displayed. This information can include the values of the data attributes of the bin at or nearest to the selected region. See, e.g., the top window 450 in FIG. 4 which shows information on interior binned data points at the location of the dragger object, namely, longitude 6571.99–6576.81, latitude 22090.8–22099.1, depth bin 10107.3–10122.6. By moving and selecting different regions using the dragger object, a user can navigate inside a volume rendered image. By reading window 450 a user can scan information on interior binned regions.

According to another embodiment of the present invention, volume rendering involving ray tracing or cell projection can be used to represent bins of aggregated data points. For ray tracing, volumes (e.g. polygons) are rendered by using bin centers as vertices. The bin positions containing no data are assumed to have zero density (completely transparent). At bin positions where data is present, the density is directly proportional to the weight of scattered data points. See, e.g., the use of ray tracing in volume rendering in the reprinted article by Levoy, "Display of Surfaces from Volume Data," *IEEE Computer Graphics and Applications*, vol. 8, No. 5, May 1988, pp. 29–37 (reprinted pages 135–43) (incorporated herein by reference).

For cell projection, cubes are constructed by using bin centers as vertices. Again, if a bin with no data is needed as a vertex to complete a cube, that vertex will have an opacity equal to zero. The opacity assigned to the vertices is then a function of the weight of scattered data points in a corresponding bin, according to the following equation:

$$opacity = 1 - exp(-u*weight),$$

where, opacity represent the opacity value of a cube, weight represents said weight of data points in a corresponding bin, u represents a global scale factor, and exp denotes an exponential function. The transparent cubes are rendered directly or by using tetrahedral decomposition in a back to front order. See, e.g., the use of cell projection in volume rendering in the articles by Wilhelms and Van Gelder, "A Coherent Projection Approach for Direct Volume Rendering," *Computer Graphics*, vol. 25, No. 4, July 1991, pp. 275–284 (incorporated herein by reference) and Stein et al., "Sorting and Hardware Assisted Rendering for Volume Visualization," IEEE 1995, pages 83–89 (incorporated herein by reference).

4. Interpolation of Numeric and Relational Datasets

The present invention describes a method, system, and computer program product that provides smooth animation of graphics between approximated scatter plots of numeric and/or relational datasets for the purpose of animation along several dimensions. Most scientific volumetric datasets have several independent attributes (variables) which correspond to spatial dimensions, a possible time dimension (usually used for animation), and one or more dependent attributes (scalar, vector, or tensor) which have real values defined throughout the domain of the independent attributes. As discussed above, one of these scalar values can be mapped to color when volume rendering.

Unlike physical datasets, relational databases have many attribute columns that are categorical (e.g., education, occupation) rather than numerical. Thus, relational databases may not have attributes that map directly to physical parameters, such as time, space, or density. According to the present invention, for purposes of visualization, assignments can be given to relational databases so that otherwise abstract quantities can be well understood.

As mentioned above, any conventional binning technique (uniform or non-uniform) can be used to bin numeric (i.e. real-valued) attributes. If a categorical attribute is mapped to an axis then the binning is defined to be the distinct values of that attribute, or some grouping of these values based on metadata. In the present invention, for example, uniform binning can be used to discretize the real attributes mapped to spatial axes and to create independent slider dimensions. Unique values can define the bins for categorical axes. According to a preferred embodiment of the present invention, a data table is used as a data structure for representing the visualization.

To further illustrate this embodiment of the present invention, an example of a relational dataset is shown below. Table 3 displays a set a related attributes before processing. In this example, Table 3 contains approximately 150,000 rows of data. The attributes shown in Table 3 include "income," "education," "occupation," "age," and "hours worked." Of course, many other attributes could also be included in Table 3.

TABLE 3

Original Data

| Income | Education | Occupation | Age | Hrs_worked |
|---|---|---|---|---|
| 0 | HS-grad | Other-services | 46 | 5 |
| 0 | HS-grad | Other-services | 46 | 5 |
| 37440 | Bachelors | Exec-man . . . | 57 | 50 |
| 0 | Preschool | Craft-repair | 5 | 0 |
| 27300 | Bachelors | Adm-clerical | 23 | 40 |
| 24410 | HS-grad | Craft-repair | 24 | 42 |
| 59127 | HS-grad | Tech-support | 40 | 40 |
| — | — | — | — | — |
| — | — | — | — | — |
| 5000 | 9th | Adm-clerical | 66 | 12 |

In order to visually represent the relationships between these attributes, the following method can be used. The processing steps (specifically steps 110, 120, 130, and 140) described above in connection with FIG. 1 can be utilized to process the original dataset stored in Table 3. First, any numeric values that are to be mapped to axes or external query dimensions are binned. For this example, education level ("education"), "occupation," and hours worked per week ("hours worked") represent the x, y, and z axes in a plot. "Age" will be shown as an external query slider dimension, thus allowing changes in distribution as "age" is varied. In this example, a first step is to bin the attributes "age" and "hours worked" to a desired resolution (see step 110). As described above, binning can be accomplished using known decision support tools having this operation. A dependent attribute, "income," is left unbinned: this attribute is to be mapped to color. After bin positions are determined (see step 120), an aggregation is performed to compute weights (see step 130). Additionally, averages for "income" are computed using the binned and numeric attributes as keys (see step 140). These aforementioned steps result in Table 4, shown below.

TABLE 4

Processed Data

| Education | Occupation | Age | Hours worked | Average income | Weight |
|---|---|---|---|---|---|
| HS-grad | Tech-support | –20 | –20 | 2543.8 | 4 |
| HS-grad | Tech-support | 20–30 | 35–40 | 23927.2 | 53 |
| — | — | — | — | — | — |
| HS-grad | Exec-man . . . | –20 | 45–50 | 23000.0 | 1 |
| HS-grad | Exec-man . . . | 20–30 | –20 | 20996.5 | 3 |
| HS-grad | Exec-man . . . | 20–30 | 25–30 | 7500.8 | 2 |
| HS-grad | Exec-man . . . | 20–30 | 30–35 | 19086.4 | 2 |
| HS-grad | Exec-man . . . | 20–30 | 35–40 | 29863.0 | 17 |
| HS-grad | Exec-man . . . | 30–40 | 40–45 | 25946.2 | 58 |
| — | — | — | — | — | — |
| Masters | Machine-op | 50–06 | –20 | 17269 | 1 |
| Masters | Machine-op | 70+ | 25–30 | 37644 | 1 |
| Masters | Machine-op | 20–30 | 35–40 | 0 | 1 |
| Masters | Machine-op | 20–30 | 40–45 | 20000 | 1 |
| — | — | — | — | — | — |
| Preschool | Priv-house . . . | 20–30 | –20 | 0 | 2 |
| Preschool | Priv-house . . . | 40–50 | 25–30 | 0 | 1 |
| Preschool | Priv-house . . . | 40–50 | 35–40 | 5000 | 2 |
| Preschool | Priv-house . . . | 60–70 | 30–35 | 12200 | 1 |

As shown in Table 4, after processing there are up to three columns for attributes mapped to axes in a 3-D plot. These columns are "education," "occupation," and "hours worked." There is also one column (here, the "weight" column) corresponding to the number (or sum of weights) of data points in each row (or bin). This sum of record weights in a bin is used to determine opacity. Each bin (or record) either has a default weight of one (1) or is weighted by one of the other columns. In some cases, it may be desirable to weight records by the value of some other attribute, rather than simply counting once for each record (i.e., in order to determine a "count"). For example, there may be a row for every town in a geographical region and a column for population. In this case, each record can instead be weighted by population.

As shown in Table 4, there is one numeric column (here, the "income" column) which represents the average value of aggregated data in each bin. This "income" column is used to map color. Finally, there may be additional columns corresponding to other attributes which are to be used for external slider dimensions (or other external interactive query devices for interactively selecting slices of the multi-dimensional space). In this example, the "age" column is used for this purpose.

Binning and aggregation can be performed as part of preprocessing. For example, according to one embodiment of the present invention, this preprocessing can be performed on the server where the database resides. Only a processed table, such as Table 4, need be returned to the client for visualization. For example, Table 4 represents a processed Table having approximately 4,800 rows and 6 columns, where the original Table 3 included approximately 150,000 rows and 200 columns.

Figure 8:
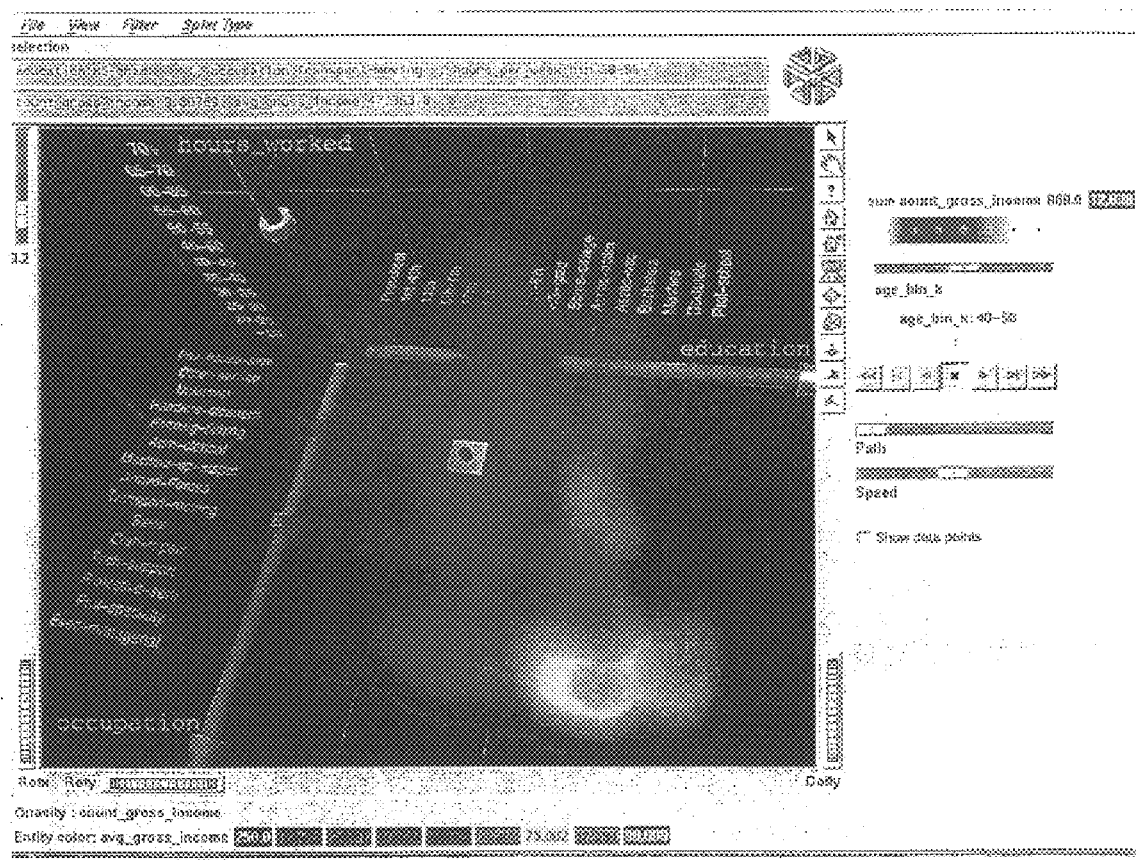
FIG. 8 is an example color image of a three-dimensional splat plot that plots "education," "occupation," and "hours worked," where "income" is mapped to color, and an external slider is used to animate over "age."

FIG. 8 shows a sample splat plot visualizing the processed data from Table 4. Here, the spatial axes are "occupation," "education," and "hours worked." "Income" is mapped to color, as indicated by the color scale shown at the bottom of the plot. The external slider in the upper right quadrant of FIG. 8 is used to animate over "age." The splat plot shown in FIG. 8 represents data for persons aged 40–50 years old.

In order to visually represent trends in the data, it is useful to animate the visualization over a particular attribute. Preferably, this animation is accomplished by tracing a path on one of the external slider dimensions. In this example, as shown in FIG. 8, the "age" dimension is binned to provide a densely populated scatter plot at any of a finite number of positions along the slider. Recall that if the binning is too highly resolved the resulting image can be too noisy to give a useful image. High resolution binning reduces the weight in each bin and hence the statistical significance. With more data, more highly resolved binning is possible without loss of usefulness. According to the present invention, between discrete slider positions, scatter plots are interpolated in order to provide smooth animation.

According to this embodiment of the present invention, there can be a separate table for each binned position on an external query slider (representing a continuous attribute). In this example, "age" is used as the slider dimension, which corresponds to 7 separate bins or discrete external slider positions (e.g., under 20, 20–30, . . ., and 60 and over). The separate tables generated corresponding to adjacent bins on an external slider need not have the same number of rows because the differences in data distribution change from one position to the next. For example, in FIG. 8, if the visualization is changed from showing 40–50 year olds to showing 50–60 year olds by moving a slider control one discrete position to the right, some bins may contain data where there was none before, and vice versa. Recall that each row in a table corresponds to a bin.

Figure 9A:
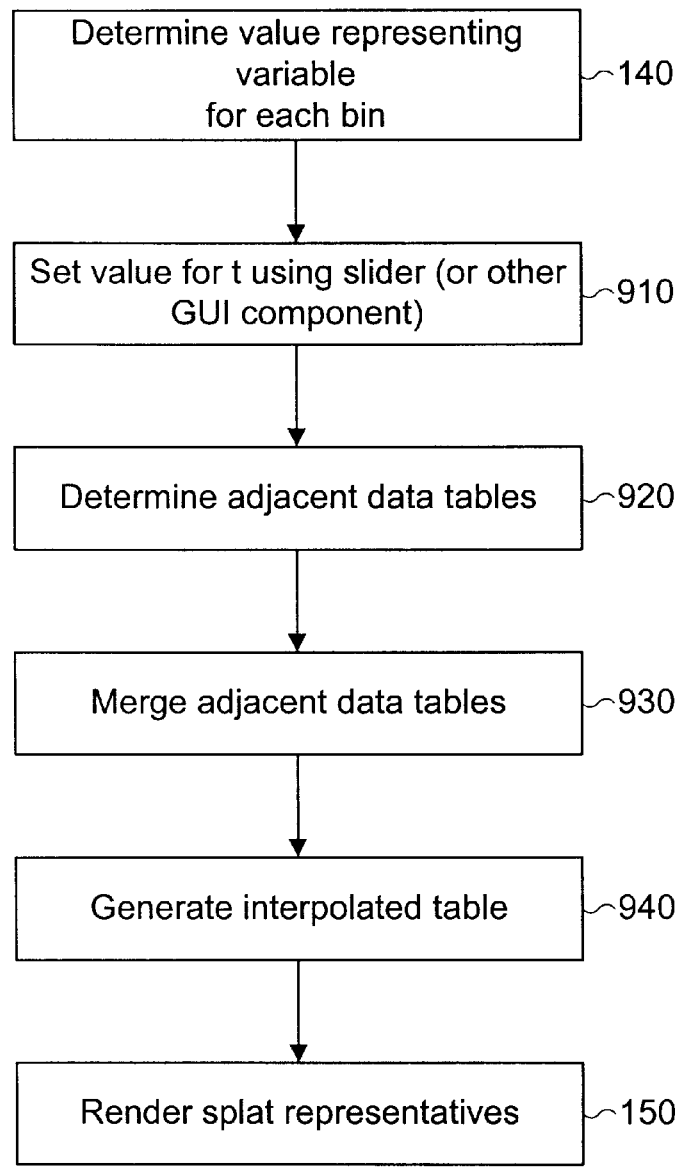
FIGS. 9A and 9B are flow charts showing a routine for animating a scatter plot of data points using an external query data attribute.

According to the present invention, an interpolation technique is performed to provide animation by using an external query data attribute. For example, this interpolation technique can be performed in an interpolation module that is part of a computer graphics environment. This interpolation technique is shown in flow chart form in FIGS. 9A and 9B. As shown in FIG. 9A, after processing steps 110 to 140, described above with reference to FIG. 1, a variable t is set (step 910). This t variable corresponds to a slider (or other GUI component) control position between two discrete external slider positions. Next, adjacent data tables are determined based on the external slider control position (step 920). Then, the adjacent data tables are merged together (step 930). Once the adjacent data tables are merged, an interpolated table is generated having interpolated bins (step 940). Subsequently, splat representatives are rendered and displayed, as described above with respect to steps 150–180 shown in FIG. 1.

For example, for interpolation on a one dimensional (1-D) external slider, two adjacent tables are merged together, then aggregated using the spatial axes columns as unique keys. The weight is then linearly interpolated. A zero ("0") weight is assumed if one of the tables lacks a particular row. An average value used for color is also interpolated, but weighted as well. These steps are illustrated below in Tables 5–8.

In this example, Table 5 and Table 6 represent adjacent "age" bins, where Table 5 corresponds to age value=20–30 and Table 6 corresponds to age value=30–40. Each Table also corresponds to a particular position on the external slider scale (e.g., the second and third discrete positions on the external slider shown in FIG. 8). According to the present invention, an image representing an interpolated scatter plot can be provided corresponding to any given position along an external slider scale.

TABLE 5

20–30 year-olds

| Education | Occupation | Hours worked | Income | Weight |
|---|---|---|---|---|
| (1) HS-grad | Exec-Man. | 15–25 | 25000 | 2 |
| (2) HS-grad | Mach-op | 45–55 | 30000 | 1 |
| (3) Masters | Technician | 25–35 | 35000 | 3 |
| . | . | . | . | . |
| . | . | . | . | . |
| . | . | . | . | . |

TABLE 6

30–40 year-olds

| Education | Occupation | Hours worked | Income | Weight |
|---|---|---|---|---|
| (1) HS-grad | Exec-Man. | 15–25 | 70000 | 1 |
| (4) Vocat'l | Mach-op | 35–45 | 40000 | 2 |
| . | . | . | . | . |
| . | . | . | . | . |
| . | . | . | . | . |

In this example, a user (or viewer) is moving the slider control from age value 20–30 to age value 30–40. In order to show an image representing a given position along the slider scale, an interpolation routine is performed to create a new table that estimates the attributes as a function of the position between the values given in adjacent Tables 5 and 6.

In this example, a variable t is used to represent an intermediate position along the slider scale a user chooses.

Thus t can range from zero (0) to one (1). In this example, a value of t=0 corresponds to the slider control being located on the second discrete position of the slider scale, and a value of t=1 corresponds to the slider control being located on the third discrete position of the slider scale. Additionally, only a few bins of adjacent Tables 5 and 6 are shown for simplicity.

Figure 9B:
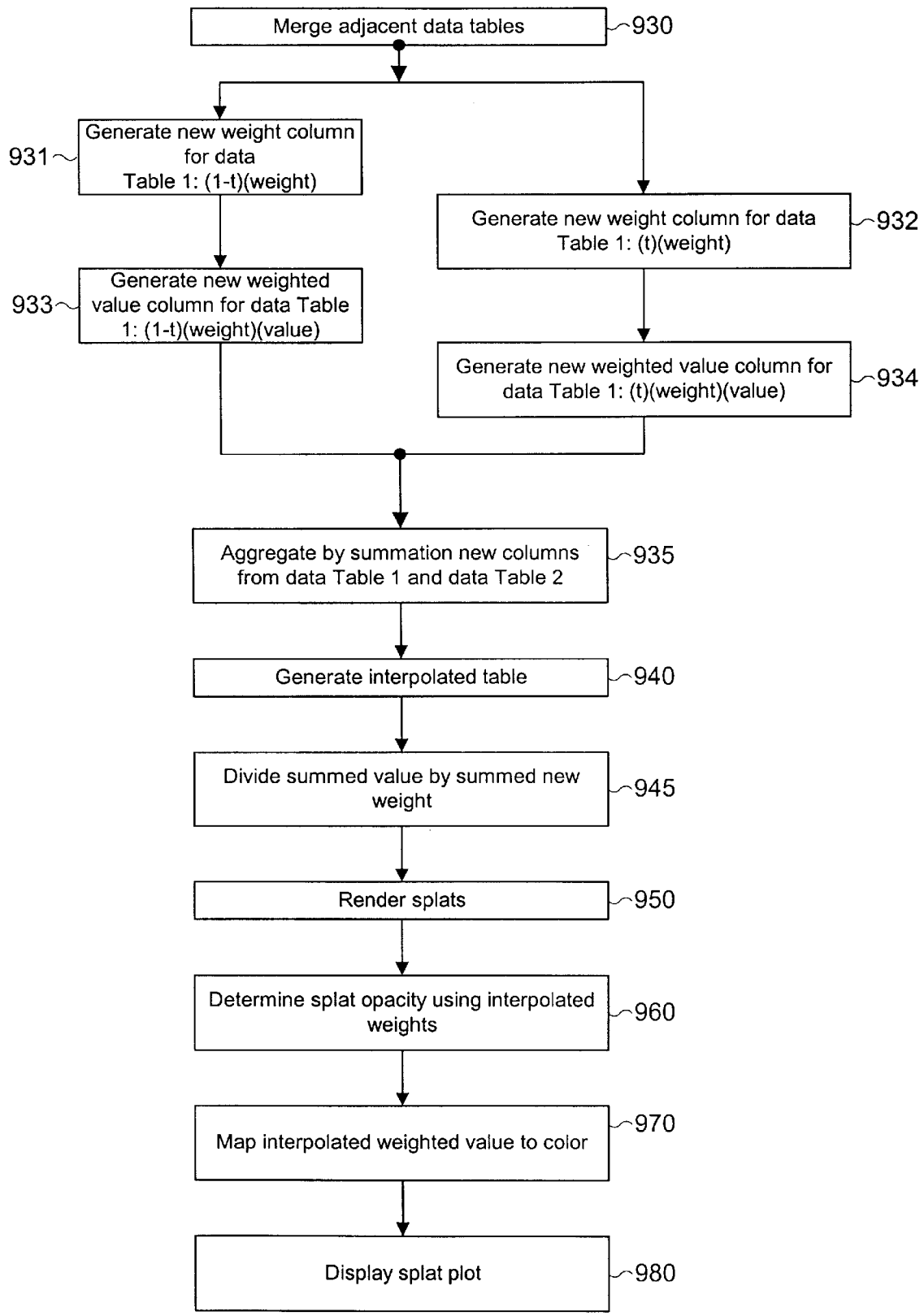

As illustrated in FIG. 9B, an interpolation routine can be described as follows. As part of step 930 (merging adjacent data tables together), a new weight column is added (step 931) to Table 5. This new weight column is equal to (1−t) (weight). Next, a new weighted value column is added (step 933) to Table 5. The new weighted value column is equal to (1−t) (weight) (value). Similarly, a new weight column is added (step 932) to Table 6. This new weight column is equal to (t)(weight). A new weighted value column is also added (step 934) to Table 6. This new weighted value column is equal to (t) (weight) (value). These two new tables are then merged together. For t=0.5 (e.g., corresponding to a mid-point position between the second and third discrete positions on the slider scale), the merged data appears as illustrated below in intermediate Table 7.

TABLE 7

Merged Data

| Education | Occupation | Hrs worked | Income | Weight | New weight | Weighted value |
|---|---|---|---|---|---|---|
| (1)HS-grad | Exec-Man. | 15–25 | 25000 | 2 | 1 | 25060 |
| (1)HS-grad | Exec-Man. | 15–25 | 70000 | 1 | .5 | 35000 |
| (2)HS-grad | Mach-op | 45–55 | 30000 | 1 | .5 | 15000 |
| (3)Masters | Tech. | 25–35 | 35000 | 3 | 1.5 | 52500 |
| (4)Vocat'l | Mach-op | 35–45 | 40000 | 2 | 1 | 40000 |
| . | . | . | . | . | . | . |
| . | . | . | . | . | . | . |
| . | . | . | . | . | . | . |

Note that Table 7 is shown here to illustrate the merged data before interpolation.

All of the unique rows have been identified using the spatial axes columns as keys. For example, the first and second bins of Table 7 have identical spatial axes columns (HS-grad, Exec-Man., and 15–25 hrs.). In order to perform interpolation, the two new columns (columns 6 and 7 of Table 7) are aggregated by summation (step 935). As a result, no two rows have the same binned values for all the spatial axes. In other words, the first and second bins of Table 7 are merged into a single bin. Recall that a zero ("0") weight is assumed if one of the tables lacks a particular row. This interpolated table is generated by dividing the summed value by the summed weight to generate the interpolated values (step 945). In this case the interpolated values are for the dependent attribute "income."Here, the interpolated value for the first and second bins of Table 7 is determined by: (25000+35000)/(1.5)=40000. The resulting interpolated data used for plotting (step 950) the interpolated scatter plot (for t=0.5) is illustrated below in Table 8.

TABLE 8

Interpolated Table

| Education | Occupation | Hrs worked | Income | Weight |
|---|---|---|---|---|
| (1) HS-grad | Exec-Man. | 15–25 | 40000 | 1.5 |
| (2) HS-grad | Mach-op | 45–55 | 30000 | .5 |
| (3) Masters | Technician | 25–35 | 35000 | 1.5 |
| (4) Vocat'l | Mach-op | 35–45 | 40000 | 1 |
| . | . | . | . | . |
| . | . | . | . | . |
| . | . | . | . | . |

Thus, at a mid-point between the second and third discrete positions of the external slider scale, an image corresponding to the interpolated values shown in Table 8 is presented to a viewer. The interpolated weights are used to determine splat opacity (step 960). In this example, the opacity of a particular splat corresponding to a particular bin is determined by the weight shown in column 5 of Table 8. As discussed above, the opacity is determined by:

$$opacity = 1 - exp(-u * weight),$$

where, weight represents the interpolated weight of data points in a corresponding bin, u represents a global scale factor, and exp denotes an exponential function.

The interpolated weighted values are then mapped to color (step 970). Finally, the splat plot at the midpoint slider control position is displayed to a viewer (step 980).

Figure 10A:
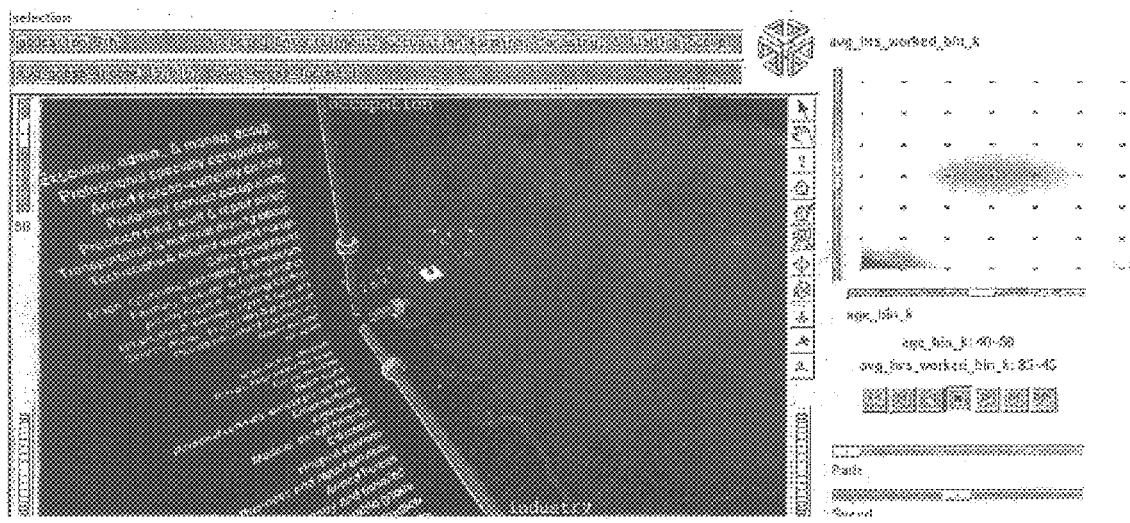
FIGS. 10A and 10B are example three-dimensional splat plots using a two dimensional external slider used to animate over "age" and "hours worked."
Figure 10B:
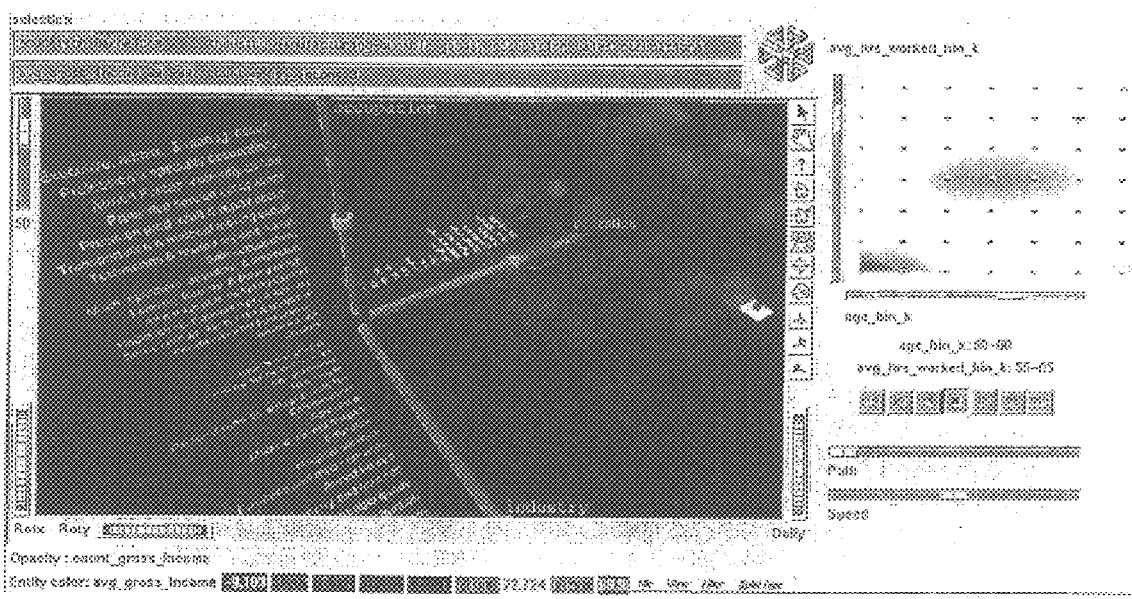

According to the present invention, a similar interpolation routine is performed if the external query slider has two dimensions. FIGS. 10A and 10B illustrate resulting images when bilinear interpolation is used. In this example, the illustrated census dataset contains approximately 150,000 rows. The spatial axes shown are "industry," "occupation," and "education," where "age" and "hours worked" are the external slider dimensions (the horizontal and vertical scales, respectively). An example 2-dimensional (2-D) external slider summary window with corresponding vertical and horizontal external sliders is shown in the upper right quadrant of FIGS. 10A and 10B. As described above, the purpose of the external slider is to allow navigation through, and show the density of the data for additional dimensions in the data. Grid points are displayed in the summary window to aid in the querying and navigation of data in the summary window. A user can query data by horizontal and vertical moving slider controls to vary the external dimensions at which data visualization is displayed. The summary window allows the user to preview specific regions of interest in which to move the slider controls, thereby allowing the user to target the data query more efficiently. The data visualization will then be updated based on the processes described above to reflect the actual or interpolated data at the point selected by the user. As shown in FIGS. 10A and 10B, the red regions in the summary window represent places where the data is dense, while white shows data areas that are sparse.

For example, FIG. 10A shows the 2-D external slider controls as selecting two 3-D slices of the data: people who are aged 40–50 and work 35–45 hours per week. The image in FIG. 10A is fairly opaque because the point selected by the user corresponds to a place where the data is dense. In contrast, FIG. 10B shows the 2-D external slider controls as selecting people who are aged 50–60 and work 55–65 hours per week. The resulting image is much less opaque because the point selected by the user corresponds to the sparse data (as indicated by the white regions of the summary window). When the slider controls are positioned over a black point within the summary window, the image shows uninterpolated data. If the slider is positioned over an intermediate region within the summary window, the image shows interpolated data generated by the processes described above.

According to the present invention, a user can trace out a path on the slider and animate over it using the tape player like control panel located directly below the horizontal slider scale in FIGS. 10A and 10B. Further, it may be possible to have the volume rendered scatter plot itself act as an external slider (for three query dimensions) to a second scatter plot or other visual tool.

Figure 11:
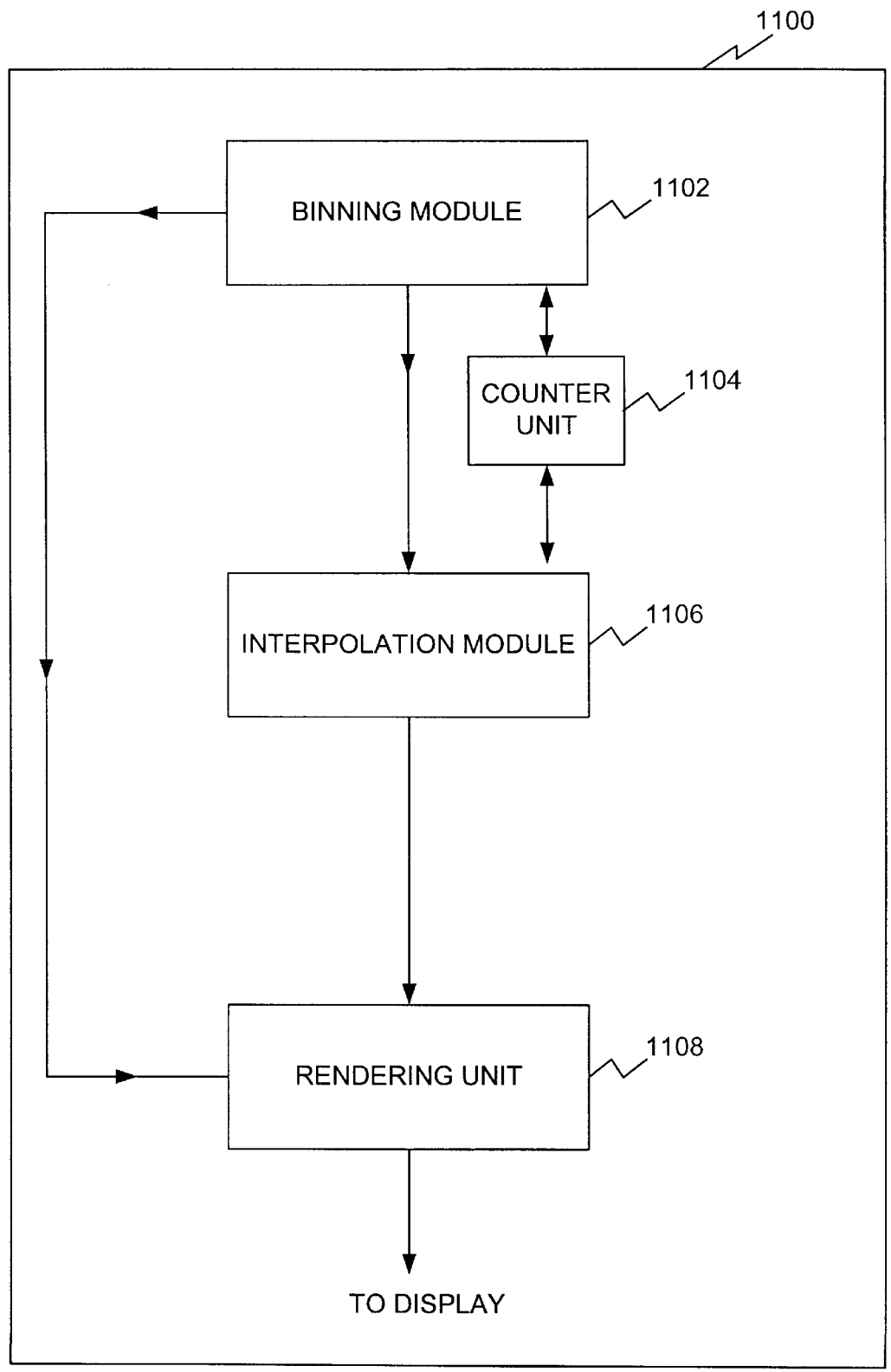
FIG. 11 is a block diagram of the computer graphics system components for executing the routine of FIGS. 9A and 9B.

The present invention may be implemented using hardware, software, firmware, or a combination thereof and may be implemented in a computer system or other processing system. In fact, in one embodiment, the invention is directed toward a computer system capable of carrying out the functionality described herein. For example, as shown in FIG. 11, a binning module 1102, as part of a computer graphics system 1100, can be used in binning the data points into bins and determining a bin position for each bin (as described in step 120 of FIG. 1). A counter unit 1104 can be used to determine a weight of scatter data points in each bin (as described in step 130 of FIG. 1). An interpolation module 1106 can be used to interpolate scatter data points corresponding to a given position between discrete positions of an external query device (not shown). In addition, interpolation module 1106 can be designed to perform steps 910 through 940 of FIGS. 9A and 9B in order to generate interpolated bins. A rendering unit 1108 can be used for rendering a data visualization representative of the interpolated bins (as described in step 150 of FIG. 9).

5. Example GUI Computer Environment

Figure 5:
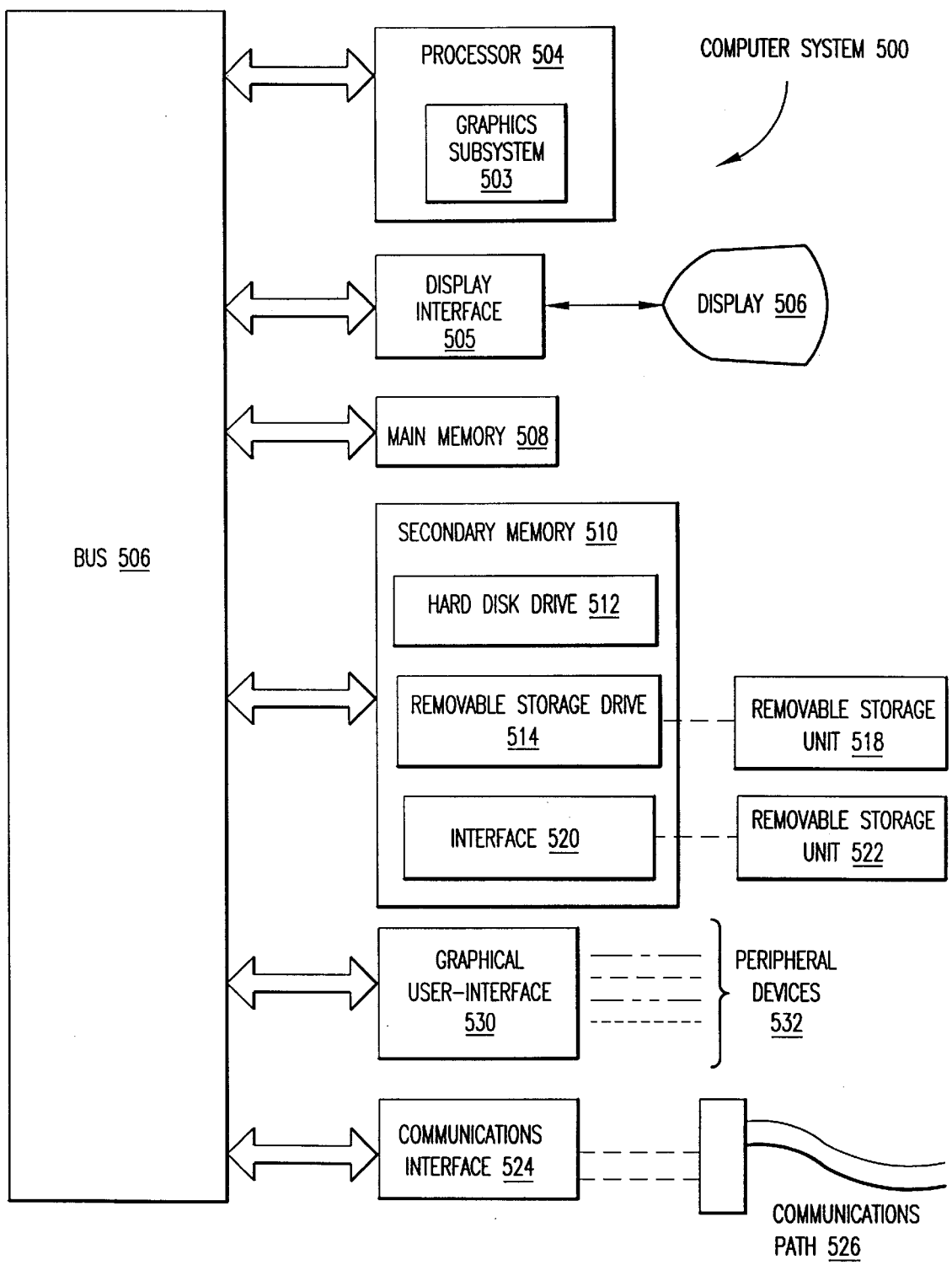
FIG. 5 shows an example computer graphics system for executing the routine of FIG. 1.

FIG. 5 is a block diagram illustrating an example environment in which the present invention can operate. The environment is a computer system 500 that includes one or more processors, such as processor 504. Computer system 500 can include any type of general computer.

The processor 504 is connected to a communications bus 506. Various software embodiments are described in terms of this example computer system. This description is illustrative and not intended to limit the present invention. After reading this description, it will be apparent to a person skilled in the relevant art how to implement the invention using other computer systems and/or computer architectures.

Computer system 500 includes a graphics subsystem 503. Graphics subsystem 503 can be implemented as one or more processor chips. The graphics subsystem 503 can be included as part of processor 504 as shown in FIG. 5 or as a separate graphics engine or processor. Graphics data is output from the graphics subsystem 503 to the bus 506. Display interface 505 forwards graphics data from the bus 506 for display on the display unit 506.

Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc., which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means can include, for example, a removable storage unit 522 and an interface 520. Examples can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices via communications path 526. Examples of communications interface 524 can include a modem, a network interface (such as Ethernet card), a communications port, etc. Software and data transferred via communications interface 524 are in the form of signals which can be electronic, electromagnetic, optical or other signals capable of being received by communications interface 524, via communications path 526. Note that communications interface 524 provides a means by which computer system 500 can interface to a network such as the Internet.

Graphical user interface module 530 transfers user inputs from peripheral devices 532 to bus 506. These peripheral devices 532 can be a mouse, keyboard, touch screen, microphone, joystick, stylus, light pen, or any other type of peripheral unit. These peripheral devices 532 enable a user to operate and control the data visualization tool of the present invention as described above.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 5. In this document, the term "computer program product" is used to generally refer to removable storage unit 518 or a hard disk installed in hard disk drive 512. These computer program products are means for providing software to computer system 500.

Computer programs (also called computer control logic) are stored in main memory and/or secondary memory 510.

Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512, or communications interface 524. Alternatively, the computer program product may be downloaded to computer system 500 over communications path 526. The control logic (software), when executed by the processor 504, causes the processor 504 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

5. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of interpolating data for animating a scatter plot of data points in a computer system capable of displaying a plurality of colors using an external query data attribute, comprising the steps of:
   (1) determining adjacent data tables corresponding to a position of a first external querying device that queries the data attribute, wherein the adjacent data tables include a first data table and a second data table, and wherein each data table comprises a plurality of processed bins of data points,
   (2) merging the first adjacent data table with the second adjacent data table;
   (3) aggregating the data points from the merged data tables using a spatial column of the data table as a unique key;
   (4) generating interpolated bins;
   (5) mapping to color an interpolated dependent attribute associated with the data points in a respective interpolated bin, wherein the interpolated attribute is weighted; and
   (6) rendering a data visualization representative of the interpolated data points.

2. The method of claim 1, wherein step (6) comprises the step of:
   rendering splats at bin positions of the interpolated bins, each splat having an opacity that is a function of the interpolated weight of data points in a corresponding bin, whereby, a splat plot can be displayed that visually approximates the scatter plot of interpolated data points.

3. The method of claim 1, wherein the interpolated attribute of step (5) is weighted by the sum of record weights.

4. The method of claim 1, wherein step (1) further comprises the step of:
   setting a value for t, wherein t represents an intermediate position between discrete positions of the first external query device, wherein a first discrete external query device position corresponds to the first data table, and a second discrete external query device position corresponds to the second data table.

5. The method of claim 4, wherein step (2) further comprises the steps of:
   (a) generating a first new weight column to add to the first data table, wherein the first new weight column is equal to $(1-t)*(weight)$;
   (b) generating a first new weighted value column to add to the first data table, wherein the first new weighted value column is equal to $(1-t)*(weight)*(value)$;
   (c) generating a second new weight column to add to the second data table, wherein the second new weight column is equal to $(t)*(weight)$,
   (d) generating a second new weighted value column to add to the second data table, wherein the second new weighted value column is equal to $(t)*(weight)*(value)$; and
   (e) aggregating by summation the new weight column and the new weighted value column from the first and second data tables.

6. The method of claim 5, wherein step (4) comprises the step of:
   generating an interpolated bin by dividing the summed new weighted value by the summed new weight to generate the interpolated values.

7. The method of claim 1 for animating at least two external query attributes of a scatter plot of data points, further comprising the steps of:
   setting a value for t, wherein t represents an intermediate position between discrete positions of the first external query device, wherein a first discrete external query device position corresponds to the first data table, and a second discrete external query device position corresponds to the second data table; and
   setting a value for v, wherein v represents an intermediate position between discrete positions of a second external query device, wherein a first position of the second external query device corresponds to a third data table, and a second position of the second external query device corresponds to a fourth data table.

8. The method of claim 1, wherein the plurality of processed bins are generated by a processing method, said processing method comprising the steps of:
   binning the data points into bins by discretizing each attribute to be plotted along a respective axis in the splat plot according to a binning resolution;
   determining a bin position for each bin; and
   determining a weight of data points in each bin.

9. The method of claim 8, wherein each bin position has at least one position coordinate, each position coordinate corresponds to an axis in the scatter plot.

10. The method of claim 9, wherein each bin position includes two position coordinates corresponding to two respective attributes associated with the data points, and further comprising the step of:
   displaying a two-dimensional splat plot that includes the rendered splats located at respective bin positions along two axes in said two-dimensional splat plot.

11. The method of claim 8, wherein each bin position includes three position coordinates corresponding to three respective attributes associated with the data points, and further comprising the step of:

displaying a three-dimensional splat plot that includes the rendered splats located at respective bin positions along three axes in said three-dimensional splat plot.

12. The method of claim 8, further comprising the steps of:

displaying a splat plot that includes the rendered splats;

displaying a dragger object;

permitting a user to select a region in the splat plot by moving the dragger object to the region; and displaying information about the region; whereby information on regions inside a rendered data visualization can be read.

13. A system for animating a scatter plot of data points using an external query data attribute, comprising:

a binning module for binning the data points into bins and for determining a bin position for each bin;

a counter unit for determining a weight of data points in each bin;

a first external query device for querying the data attribute of said bins;

an interpolation module for interpolating data points corresponding to an intermediate position between discrete positions of said first external query device, wherein said first external query device corresponds to the external query attribute of said data points; and a rendering unit for rendering a data visualization representative of the interpolated data points.

14. The system of claim 13, wherein said rendering unit renders splats at bin positions of interpolated bins, each splat having an opacity that is a function of an interpolated count of data points in said interpolated bin, whereby a splat plot can be displayed that visually approximates the scatter plot of data points.

15. The system of claim 14, wherein each bin position includes three position coordinates corresponding to three respective attributes associated with the data points, and wherein said rendering unit displays a three-dimensional splat plot that includes said rendered splats located at respective bin positions along three axes in said three-dimensional splat plot.

16. The system of claim 14, further comprising:

a second external query device for querying a second attribute of the data points, wherein said interpolation module interpolates data points corresponding to an intermediate position between discrete positions of said second external query device.

17. The system of claim 16, wherein said interpolation module determines a value for t, wherein t represents a position between discrete positions of said first external query device, wherein a first discrete position of said first external query device corresponds to a first data table, and a second discrete position of said first external query device corresponds to a second data table, and wherein said interpolation module determines a value for v, wherein v represents a given position between discrete positions of said second external query device, wherein a first discrete position of said second external query device corresponds to a third data table, and a second position of said second external query device corresponds to a fourth data table.

18. The system of claim 13, wherein said interpolation module determines a value for t, wherein t represents said intermediate position between said discrete positions of said first external query device, wherein a first discrete position of said first external query device corresponds to a first data table, and a second discrete position of said first external query device corresponds to a second data table, and wherein said interpolation module generates an interpolated bin based on said value for t.

19. The system of claim 18, wherein said interpolation module merges said first adjacent data table with said second adjacent data table and aggregates said merged data points using spatial columns of said data tables as unique keys, wherein said first and second adjacent data tables each comprise a plurality of processed bins of data points.

20. A computer program product comprising a computer useable medium having computer program logic recorded thereon for enabling a graphics processor in a computer system to animate an external query attribute of a scatter plot of data points that visually approximates a scatter plot of data points, said computer program logic comprising:

means for enabling the graphics processor to bin the data points into bins;

means for enabling the graphics processor to determine a bin position for each bin;

means for enabling the graphics processor to determine a count of data points in each bin;

means for enabling the graphics processor to interpolate data points corresponding to an intermediate position between discrete positions of an external query device, wherein said external query device queries the external query attribute of the data points; and means for enabling the graphics processor to render a data visualization representative of the interpolated data points.

21. The computer program product of claim 20, wherein said means for enabling the graphics processor to render a data visualization renders splats at bin locations of interpolated bins, each splat having an opacity that is a function of said interpolated count of data points in a corresponding bin, whereby, a splat plot can be displayed that visually approximates the scatter plot of interpolated data points.

22. A system for animating an external query attribute of a visually approximated scatter plot of data points, comprising:

means for binning the data points into bins;

means for determining a bin position for each bin;

means for determining a weight of data points in each bin;

means for externally querying the attribute of said bins;

means for interpolating data points corresponding to a given position between discrete positions of said external query means, wherein said external query means corresponds to the external query attribute of said data points; and means for rendering splats at bin positions of interpolated bins, each splat having an opacity that is a function of an interpolated weight of data points in said interpolated bin, whereby a splat plot can be displayed that visually approximates the scatter plot of data points.

23. The system of claim 22, further comprising:

means for displaying a splat plot that includes said rendered splats;

means for displaying a dragger object;

means for permitting a user to select a region in the splat plot by moving said dragger object to said region; and means for displaying information about said region; whereby information on regions inside a rendered splat plot can be read.

* * * * *